(12) United States Patent
Gálffy

(10) Patent No.: US 11,334,093 B2
(45) Date of Patent: May 17, 2022

(54) METHOD AND CONTROLLER FOR CONTROLLING AN AIRCRAFT BY IMPROVED DIRECT LIFT CONTROL

(71) Applicant: Turbulence Solutions GMBH, Vienna (AT)

(72) Inventor: András Gálffy, Baden (AT)

(73) Assignee: Turbulence Solutions GMBH

( * ) Notice: Subject to any disclaimer, the term of this patent is extended or adjusted under 35 U.S.C. 154(b) by 72 days.

(21) Appl. No.: 16/619,301

(22) PCT Filed: Jun. 6, 2018

(86) PCT No.: PCT/EP2018/064932
§ 371 (c)(1),
(2) Date: Dec. 4, 2019

(87) PCT Pub. No.: WO2018/224565
PCT Pub. Date: Dec. 13, 2018

(65) Prior Publication Data
US 2020/0150690 A1    May 14, 2020

(30) Foreign Application Priority Data
Jun. 7, 2017 (AT) .............................. A 60048/2017

(51) Int. Cl.
*G05D 1/00* (2006.01)
*G05D 1/08* (2006.01)
*B64C 13/04* (2006.01)
*B64C 13/18* (2006.01)
*B64C 13/50* (2006.01)

(52) U.S. Cl.
CPC ........... *G05D 1/0808* (2013.01); *B64C 13/04* (2013.01); *B64C 13/18* (2013.01); *B64C 13/503* (2013.01)

(58) Field of Classification Search
CPC ...... G05D 1/0808; B64C 13/04; B64C 13/18; B64C 13/503
See application file for complete search history.

(56) References Cited

U.S. PATENT DOCUMENTS

| 4,261,537 A * | 4/1981 | Frosch ................. G05D 1/0607 244/181 |
| 5,186,416 A | 2/1993 | Fabre et al. |
| 2009/0157239 A1 | 6/2009 | Walton et al. |
| 2016/0023749 A1 * | 1/2016 | Carton ................... B64D 39/00 701/4 |

* cited by examiner

Primary Examiner — Ian Jen
(74) Attorney, Agent, or Firm — Levenfeld Pearlstein, LLC

(57) ABSTRACT

The present invention discloses a method and flight controller for controlling an aircraft, comprising the following step: —determining the pitch control input $\delta_E$ for at least one pitch moment generator element, based on the lift control input $\delta_F$ for at least one lift generator element; wherein the step of determining the pitch control input $\delta_E$ based on the lift control input $\delta_F$ includes the step of determining a feed forward filter output $F_{q,\delta_E,\delta_F}(q)$.

18 Claims, 16 Drawing Sheets

| Input | Before identification | During identification |
|---|---|---|
| $\delta_A$ | $\varphi$ – control, $\varphi^{des} = 0$ rad | $\varphi$ – control, $\varphi^{des} = 0$ rad |
| $\delta_E$ | $\theta$ – control, $\theta^{des} = 0$ rad | $\delta_{E,ID}$ |
| $\delta_F$ | 0 | 0 |
| $\delta_R$ | $a_{yB}$ – control, $a_{yB}^{des} = 0$ m/s² | $a_{yB}$ – control, $a_{yB}^{des} = 0$ m/s² |
| $\delta_T$ | $V_A$ – control, $V_A^{des} = 12$ m/s | $\delta_{T,0}$ |

Fig. 2

| Input | Before identification | During identification |
|---|---|---|
| $\delta_A$ | $\varphi$ – control, $\varphi^{des} = 0$ rad | $\delta_{A,ID}$ |
| $\delta_E$ | $\theta$ – control, $\theta^{des} = 0$ rad | $\theta$ – control, $\theta^{des} = 0$ rad |
| $\delta_F$ | 0 | 0 |
| $\delta_R$ | $a_{yB}$ – control, $a_{yB}^{des} = 0$ m/s² | $\delta_{R,0}$ |
| $\delta_T$ | $V_A$ – control, $V_A^{des} = 12$ m/s | $\delta_{T,0}$ |

Fig. 3

| Input | Before identification | During identification |
|---|---|---|
| $\delta_A$ | $\varphi$ – control, $\varphi^{des} = 0$ rad | $\varphi$ – control, $\varphi^{des} = 0$ rad |
| $\delta_E$ | $\theta$ – control, $\theta^{des} = 0$ rad | $\theta$ – control, $\theta^{des} = 0$ rad |
| $\delta_F$ | 0 | 0 |
| $\delta_R$ | $a_{yB}$ – control, $a_{yB}^{des} = 0$ m/s² | $\delta_{R,ID}$ |
| $\delta_T$ | $V_A$ – control, $V_A^{des} = 12$ m/s | $\delta_{T,0}$ |

Fig. 4

| Input | Before identification | During identification |
|---|---|---|
| $\delta_A$ | $\varphi$ – control, $\varphi^{des} = 0$ rad | $\varphi$ – control, $\varphi^{des} = 0$ rad |
| $\delta_E$ | $\theta$ – control, $\theta^{des} = 0$ rad | $\delta_{E,0}$ |
| $\delta_F$ | 0 | $\delta_{F,ID}$ |
| $\delta_R$ | $a_{yB}$ – control, $a_{yB}^{des} = 0$ m/s² | $a_{yB}$ – control, $a_{yB}^{des} = 0$ m/s² |
| $\delta_T$ | $V_A$ – control, $V_A^{des} = 12$ m/s² | $\delta_{T,0}$ |

Fig. 9

| Input | Before identification | During identification |
|---|---|---|
| $\delta_A$ | $\varphi$ – control, $\varphi^{des} = 0$ rad | $\varphi$ – control, $\varphi^{des} = 0$ rad |
| $\delta_E$ | $\delta_{E,0}$ | $\delta_{E,ID}$ |
| $\delta_F$ | $c_{yB}$ – control, $c_{zB}^{des} = c_{zB,0}$ | $c_{zB}$ – control, $c_{zB}^{des} = c_{zB,0}$ |
| $\delta_R$ | $a_{yB}$ – control, $a_{yB}^{des} = 0$ m/s$^2$ | $a_{yB}$ – control, $a_{yB}^{des} = 0$ m/s$^2$ |
| $\delta_T$ | $V_A$ – control, $V_A^{des} = 12$ m/s | $V_A$ – control, $V_A^{des} = 12$ m/s |

Fig. 13

| Input | Before identification | During identification |
|---|---|---|
| $\delta_A$ | $\varphi$ – control, $\varphi^{des} = 0$ rad | $\varphi$ – control, $\varphi^{des} = 0$ rad |
| $\delta_E$ | $\theta$ – control, $\theta^{des} = 0$ rad | $\theta$ – control, $\theta^{des} = 0$ rad |
| $\delta_F$ | 0 | 0 |
| $\delta_R$ | $a_{yB}$ – control, $a_{yB}^{des} = 0$ m/s$^2$ | $a_{yB}$ – control, $a_{yB}^{des} = 0$ m/s$^2$ |
| $\delta_T$ | $V_A$ – control, $V_A^{des} = 12$ m/s | $\delta_{T,ID}$ |

Fig. 16

METHOD AND CONTROLLER FOR CONTROLLING AN AIRCRAFT BY IMPROVED DIRECT LIFT CONTROL

CROSS-REFERENCE TO RELATED APPLICATION DATA

This application is a US National Stage Application of PCT/EP2018/064932, filed Jun. 6, 2018, titled Method and Controller for Controlling an Aircraft by Improved Direct Lift Control, which claims the benefit of and priority to Austrian Application No. A 60048/2017, filed Jun. 7, 2017, the disclosures of which are incorporated herein in their entirety.

FIELD OF THE INVENTION

The present invention relates to a method and controller for controlling an aircraft, particularly for controlling the vertical acceleration. The invention also relates to an aircraft and a simulator using the inventive method or controller.

Particularly the invention relates to a so called direct lift control. To this end, lift generating elements like flaps, slats, spoilers, micro-thruster or the like are actuated to generate the so called direct lift. The principles of the direct lift concept are known to the man skilled in the art.

A controller of an aircraft may use the so-called path following control (PFC) concept for a fixed wing aircraft. Prior concepts of direct lift control suffer from undesired resonances due to angle of attack oscillations. The present invention proposes a control concept for the vertical acceleration allowing to more than double a controller's bandwidth compared to classical approaches. By using a dynamic flap actuation, the lift, and therefore vertical acceleration, can be manipulated more quickly than by rotating the whole aircraft by means of the elevator. Thus, in the disclosed concept, flap deflection is used as primary control input, and the elevator serves for maintaining the wings in their operational range and returning the flaps to their neutral position.

The disadvantages of classical lift generation by means of elevator deflection are caused by the necessary rotation of the aircraft. The rotation of the aircraft to change the angle of attack and thereby indirectly increase the lift causes a delay of lift generation which limits the possible bandwidth of lift control. Furthermore, due to the rotation the pitch angle of the aircraft varies for indirect lift generation. In consequence, angular accelerations lead to undesired accelerations at cabin areas which are located distant from the center of gravity. In this context, direct lift control aims to overcome these drawbacks by directly generating lift without requiring the rotation of the aircraft. Unfortunately, for state-of-the-art direct lift control an angle of attack oscillation appears in the dynamic region of the resonance frequency of the short-period mode. This angle of attack variation is not caused by additional pitching moments, which may be generated by direct lift control surfaces, but due to the aircraft's motion caused by the lift variation. The resulting angle of attack variation generates a lift variation which opposes the intended direct lift. Therefore, an anti-resonance occurs which lowers the effectiveness of state-of-the-art direct lift control.

PRIOR ART

U.S. Pat. No. 4,261,537 and US 2016/023749 A1 disclose a prior art direct lift control.

US 2009/157239 A1 discloses an elevator gain shaping providing an input signal for the elevator control.

SUMMARY OF THE INVENTION

It is an object of the invention to provide a method and controller for controlling an aircraft or an aircraft simulator by use of a direct lift control.

The object of the present invention is solved by a method according to claim 1 a computer program product according to claim 9, and a flight controller according to claim 10. The depending claims are directed to embodiments of the invention.

The disclosed method for controlling an aircraft includes the step of determining the pitch control input $\delta_E$ for at least one pitch moment generator element, based on the lift control input $\delta_F$ for at least one lift generator element, wherein the step of determining the pitch control input $\delta_E$ based on the lift control input $\delta_F$ includes the step of determining a feed forward filter output $F_{q,\delta E,\delta F}(q)$ of the lift control input or state of lift generating element.

The disclosed method and flight controller concern an aircraft, which advantageously includes at least one lift generator element, the direct effect of which on the lift of the aircraft is faster than that of the elevator or other types of pitch moment generator elements. If the lift generator element can alter the lift only to one direction, i.e. only increase or only decrease lift, a partial pre-actuation of the lift generator element allows subsequent alteration of lift in both directions. E.g. if spoiler deflection only allows for lift decrease, a pre-deflection of the spoiler allows subsequent deflection of the spoiler in both directions and thereby alter the lift in both directions. The lift control input $\delta_F$ can be commanded by the pilot, a flight controller, an autopilot or the like.

In a first embodiment, at least one lift generator element is an aerodynamic surface of the aircraft adapted to modify the lift of the aircraft. The aerodynamic surface of the aircraft is preferably one of the following elements: a spoiler of the aircraft; a flaperon of the aircraft; a flap of the aircraft; a slat of the aircraft.

In a second embodiment, at least one lift generator element is a micro-thruster or propulsion unit adapted to generate an action modifying the lift of the aircraft or directly generating a force in lift direction.

In a third embodiment, at least one lift generator element is a wing, which is capable of changing the incidence angle and/or the wing shape.

For the aforementioned embodiments the pitch moment generator element is preferably one of the following: an elevator of the aircraft; a horizontal stabilizer of the aircraft; a canard foreplane of the aircraft; a micro-thruster of the aircraft; a propulsion unit of the aircraft; a wing, which is capable of changing the incidence angle and/or the wing shape.

The invention also discloses a method for controlling an aircraft, comprising the steps of determining the commanded elevator angle $\delta_E$ based on the flap element angle $\delta_F$, wherein the step of determining the commanded elevator angle $\delta_E$ based on the flap element angle $\delta$, includes the step of determining a feed forward elevator deflection $F_{q,\delta E,\delta F}(q)$ of the elevator angle. The method may control the vertical acceleration of the aircraft. The flap element angle may be the commanded flap element angle and/or the actual flap element angle. In this embodiment, the flap element angle $\delta$, is the lift control input and the commanded elevator angle $\delta_E$ is the pitch control input. The flap element angle $\delta_F$ can be commanded by the pilot, a flight controller, an autopilot or the like.

The invention also discloses a flight controller adapted to control at least one of an aircraft and a component of a flight simulator. The flight controller comprises a feed forward filter adapted to determine the elevator angle $\delta_E$ based on the flap element angle $\delta_F$, wherein the feed forward filter $F_{q,\delta E,\delta F}(q)$ determines a feed forward elevator deflection based on the flap element angle $\delta_F$.

The benefit of including the feed forward filter is that the angle of attack oscillation, which is caused by direct lift generation and leads to the antiresonance, is reduced and consequently the effectiveness of the direct lift control is improved. Additionally, using the flap elements as primary control input further raises the achievable bandwidth of the disclosed control method. The improved dynamic response of the system amongst others facilitates higher flight path precision, disturbance rejection, turbulence alleviation and touchdown precision during landings.

The embodiments are described below with reference to the method and flight controller for the sake of brevity.

The flap element angle may be a flap angle, a flaperon angle, a spoiler angle, a slat angle or the like. The control concept will be explained and demonstrated for an aircraft comprising two flaps and two flaperons.

Determining the elevator angle $\delta_E$ based on the flap element angle $\delta$, may comprise a high pass filtering the flap element angle $\delta$, by a high pass, a high pass filtering the flap element angle $\delta_F$ by a lead-filter or a high pass filtering the flap element angle $\delta_F$ by a high pass of second order.

In one embodiment the feed forward elevator deflection $F_{q,\delta E,\delta F}(q)$ is determined by the following formula:

$$F_{q,\delta E,\delta F}(q) = \frac{b_1 q + b_2 q^2}{q^2 + 2\xi_F \omega_F q + \omega_F^2}$$

wherein
q is the Laplace variable;
$b_1$ is a first optimization parameter;
$b_2$ is a second optimization parameter;
$\xi_F$ is a third optimization parameter; and
$\omega_F$ is a fourth optimization parameter.
$\xi_F$ may be a filter damping factor. $\omega_F$ may be a resonance frequency.

The parameter $b_1$, $b_2$, $\xi_F$ and $\omega_F$ may be optimized by minimizing the following cost function:

$$J = \Sigma_{\omega_k \in \Omega} |\tilde{P}_{q,\delta_F}(j\omega_k) - \tilde{P}_{q,\delta_F}^{des}(j\omega_k)|$$

wherein $\tilde{P}_{\delta_F}$ is an optimal fit to a desired plant $\tilde{P}_{\delta_F}^{des}$ by tuning the parameter vector $[b_1\ b_2\ \xi_F\ \omega_F]$.

Determining the commanded elevator angle $\delta_E$ based on the candidate elevator angle $\delta_E^C$ and on the flap element angle $\delta_F$ may include adding the feed forward elevator deflection $F_{q,\delta E,\delta F}(q)$ to a candidate elevator angle $\delta_E^C$. The flight controller may comprise an adder for adding the feed forward elevator deflection $F_{q,\delta E,\delta F}(q)$ to the candidate elevator angle $\delta_E^C$. The candidate elevator angle $\delta_E^C$ can be commanded by the pilot, a flight controller, an autopilot or the like.

The method and flight controller may determine the commanded flap element angle $\delta_F^{des}$ and determine the candidate elevator angle $\delta_E^C$ based on the flap element angle $\delta_F$ and the desired flap element angle $\delta_F^{des}$ of the aircraft, such as by a first controller. The desired flap element angle $\delta_F^{des}$ may be commanded by a pilot or any flight computer.

Determining a candidate elevator angle $\delta_E^C$ may include a PI control based on the flap element angle $\delta_F$ and the desired flap element angle $\delta_F^{des}$ of the aircraft. The first controller may be a PI controller.

The method and flight controller may comprise or execute the following steps, e.g. by a second controller: determining the actual vertical acceleration $a_{zB}$ of the aircraft, determining the desired vertical acceleration $a_{zB}^{des}$ of the aircraft, and controlling the flap element angle $\delta_F$ based on the actual vertical acceleration $a_{zB}$ of the aircraft and desired vertical acceleration $a_{zB}^{des}$ of the aircraft. The method may implement a PI control. The second controller may be a PI controller. The desired desired vertical acceleration $a_{zB}^{des}$ may be commanded by a pilot or any flight computer.

The control based on the commanded flap element angle $\delta_F$ and the desired flap element angle $\delta_F^{des}$ of the aircraft has a lower bandwidth than the control based on the actual vertical acceleration $a_{zB}$ of the aircraft and desired vertical acceleration $a_{zB}^{des}$ of the aircraft. The first controller may have a lower bandwidth than the second controller.

The vertical acceleration $a_{zB}$ of the aircraft and the desired vertical acceleration $a_{zB}$ of the aircraft are normalized by the following formula, such as by a normalization unit:

$$c_{zB} = \frac{a_{aB}}{V_A^2} \frac{V_{ref}^2}{a_{ref}}$$

wherein
$c_{zB}$ is the coefficient of normalized acceleration;
$V_A$ is the actual air speed;
$V_{ref}$ is the reference air speed; and
$a_{ref}$ is the vertical reference acceleration.

In one embodiment, the actual air speed $V_A$ and the actual vertical acceleration $a_{zB}$ may be provided by a sensor of an aircraft.

In another embodiment, the coefficient of normalized acceleration $c_{zB}$, the actual air speed $V_A$, and the actual vertical acceleration $a_{zB}$ may be provided by a simulator.

The invention also discloses a computer program product that when loaded into a memory of a computer having a processor executes the above method. The invention also discloses an aircraft comprising the above flight controller. The invention also discloses a simulator comprising the above flight controller.

BRIEF DESCRIPTION OF THE DRAWINGS

The invention is now described in detail with reference to the accompanying drawings showing exemplary and not restricting embodiments of the invention, wherein:

FIG. 2 shows a table for an equilibrium state for $P_{\omega_{yB}}$-identification;

FIG. 3 shows a table for an equilibrium state for $P_{\omega_{xB}}$-identification;

FIG. 4 shows a table for an equilibrium state for $P_{a_{yB}}$-identification;

FIG. 9 shows an equilibrium state for $P_{\delta_F}$ and $\tilde{P}_{\delta_F}$-identification;

FIG. 13 depicts a table showing an equilibrium state for $P_{\delta_F,\delta_E}$-identification;

FIG. 16 shows a table for an equilibrium state for $P_{a_zB}$-identification.

DETAILED DESCRIPTION OF THE DRAWINGS

Figure 1:
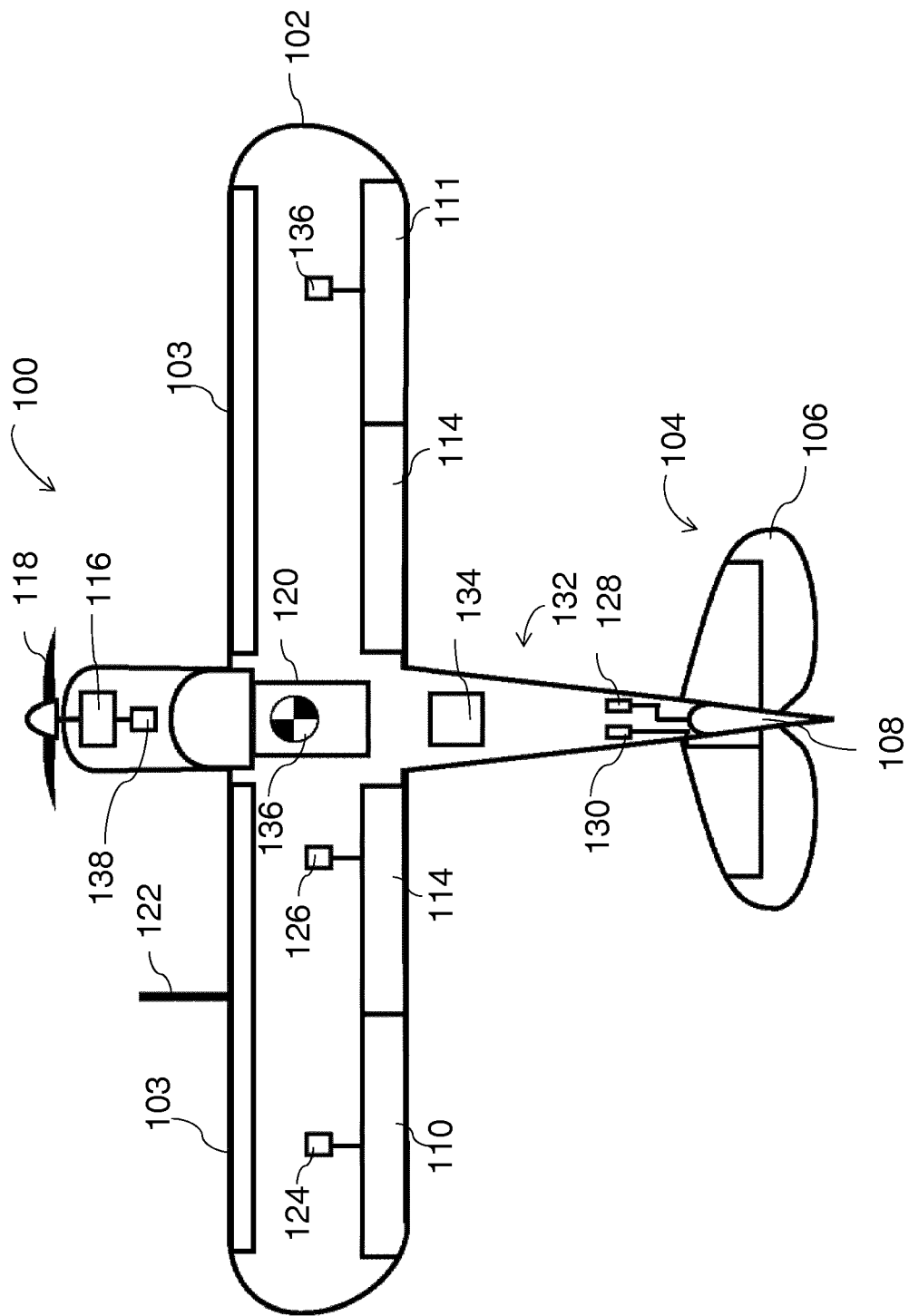
FIG. 1 shows a schematic top view of an aircraft implementing the invention.

Reference is made to FIG. 1. A fixed wing aircraft 100 used for validation of the concept is a model of a Piper PA18 Super Cub with a span of 1300 mm. The original version has a span of 10.7 m, thus, the scaling factor is 1:8.25. This type of airplane is known for very good take-off and landing performance. Therefore, it is also considered to be a "Short Take-Off and Landing" (STOL) aircraft.

The fixed wing aircraft 100 comprises wings 102 and a tail 104 having an elevator 106 and a rudder 108. The wings 102 comprise ailerons 110, 111 and flaps 114. A motor 116 drives a propeller 118. The aircraft 100 is controlled by a flight controller 120, which is connected to the first servo 124 actuating the left aileron 110 and to the second servo 130 actuating the elevator 106. The flight controller 120 is further connected to the third servo 138 controlling the motor 116. A forth servo 128 actuating the rudder 108 is connected to the flight computer 120. The fifth servo 126 actuating the flaps 114 is also connected to the flight controller 120. The sixth servo 136 actuating the right aileron 111 is connected to the flight controller 120. The aircraft comprises a Pitot-static-tube 122 for measuring the air speed, wherein the Pitot-static-tube 122 is operatively coupled with the flight controller 120. The aircraft 100 further comprises a GNSS and magnetic flux sensor 134 operatively coupled with the flight controller 120 for determining the absolute position of the aircraft 100.

A special feature of this particular model aircraft are vortex generators 103, which are located in the first quarter of the upper surface of the wings 102. By purposeful disturbance of the boundary layer, an early transition from laminar airflow to turbulent airflow is triggered. This entails an intensified exchange of lower energetic air of the boundary layer with higher energetic air of the outside air flow.

Therefore, the stall characteristic of the wing can be improved, particularly the boundary layer stays attached for higher angles of attack. As rapid flap deflections will be used, the vortex generators may improve the response to intended lift manipulations. The interface between the physical world and the mathematical quantities, which are inputs and outputs of the calculations for the flight control, is given by sensors and actuators.

As to the air speed sensor 122, by means of a pitot-static tube, the differential pressure between total pressure $p_t$ and static pressure $p_s$, called dynamic pressure $$q = p_t - p_s = \frac{\rho}{2}V_A^2,$$

is determined, with the air density $\rho$, and the airspeed $V_A$. Thus, the airspeed can be calculated as $$V_A = \sqrt{\frac{2(p_t - p_s)}{\rho}}.$$

The root-characteristic of the measurement principle implies that for small $V_A$ and therefore small pressure difference $q=p_t-p_s$, small variations of the measured pressure $\Delta q$ yield large airspeed variations $\Delta V_A$. Therefore, noise of the pressure measurement has got high impact on the measured airspeed on the ground, i. e., for $V_A \approx 0$ m/s. However, in-flight, for higher airspeeds, the determination of $V_A$ by means of a pressure measurement becomes more reliable.

The purpose of measuring the airspeed $V_A$ is to have information about the aerodynamic effects, which depend on the speed in the air rather than the speed over ground. For an accurate measurement, the pitot-static tube must be placed where the air flow is ideally undisturbed. The pitot-static tube has to be placed outside the boundary layer, i. e., not too close to the aircraft's surface, where the air flow slows down. The speed of the airflow varies on the wing's upper and lower surface as well as at different fuselage positions, depending on the curvature of the surfaces and how the airflow approaches. Thus, a position without significant air stream deflection is endeavored. Considering a single motor aircraft like the Piper PA18, the airflow at the fuselage is highly affected by the propeller's slipstream. Therefore, an airspeed measurement close to the fuselage would be disturbed by the thrust setting. Placing the pitot-static tube too far to the wing tip, e. g., at a distance $d_{tip}$, would cause coupling of angular rates about the vertical body axis $\omega_{zB}$, due to the superposed tangential velocity $\Delta V = d_{tip}\omega_{zB}$.

Bearing in mind these criteria, the pitot-static tube is installed protruding from the boundary layer, in front of the wing before significant airflow deflection, outside the propeller's slipstream, but still not too far towards the wing tip.

As to the flight controller 120 comprising the accelerometer, gyroscopes and altimeter 136 by means of MEMS technology, multiple accelerometers 136 measuring the acceleration along the body axes are installed. The difference of acceleration between the body to be measured, i. e., the aircraft 100, and a reference mass, which is part of the MEMS-structure, is determined. Thus, MEMS accelerometers are not capable of measuring gravity, which is a body force, and therefore, acts the same way on both bodies. The measurement principle of the gyroscopes 136 is based on the intentionally excited oscillation of a MEMS-structure.

An angular rate about a specific axis causes a secondary oscillation due to Coriolis effects, which is measured. By measuring in three orthogonal directions, the accelerations and angular rates of all three body axes are measured. Finally, the barometric altitude is measured by a barometer 136, which measures the static pressure. Due to an approximately exponential pressure drop as a function of altitude, the barometric altitude can be calculated from the pressure measurement.

The Pixhawk Flight-Controller 120, which comprises the above sensors 136, is placed inside the fuselage 132, close to the center of gravity. Besides the available space at this position, placing the accelerometers 136 at the center of gravity provides the advantage of not measuring parasitic accelerations due to angular movements.

The combined module 134 delivers GPS (GNSS) position data as well as 3D magnetic flux information. The GPS position is determined by the position and time information received from at least four satellites. By distance calculation based on the time of flight of the received signals and trilateration, the desired information of position and time is obtained. By means of anisotropic magneto-resistive sensors 134, the 3-axes digital compass converts any incident magnetic field in the sensitive axes directions to a differential voltage output which represents the measured magnetic flux. For best reception of the GPS signal, placing the module on the top face of the aircraft is endeavored. The magnetic flux should be placed at a spot of low magnetic interference, caused by the BLDC-motor 116 and motor controller 138, which are positioned in the front part of the aircraft. Therefore, the sensor unit 134 is placed at the rear part of the top face.

The actuators of the model aircraft are mainly the servos 124, 126, 128, 130 136, 138, which deflect the control surfaces, and the throttle input for the BLDC motor controller. All control surfaces are configured to have a maximum deflection of about 25°. The input signals for elevator deflection $\delta_E$, and rudder deflection $\delta_R$, are directly used as the servo inputs for the elevator servo 130 and rudder servo 128, respectively. For positive $\delta_E$, the elevator moves up, for positive $\delta_R$ the rudder moves to the right. The input signal for aileron deflection $\delta_A$ actuates the servos 124, 136 of the left and right aileron in opposite directions. For positive $\delta_A$, the right aileron 111 moves up and the left aileron 110 moves down. The input signal for flap deflection $\delta_F$ also actuates the aileron servos, and additionally the servo of the flaps. For positive $\delta_F$ all three servos move down to the same extent. Thus, the ailerons are used as so called "flaperons", i. e., control surfaces, which are used as both, aileron and flaps. Therefore, the input for flap deflection 6F influences the curvature of the whole wing, instead of only the middle part. This results in two favorable effects. Firstly, the achieved increase or decrease of lift is greater. Secondly, the parasitic effect of a pitching moment is reduced, which shall be briefly outlined. The control surface deflection increases the lift in the rear part of the wing, which is behind the center of gravity. Thus, in principle a pitch down moment is generated by flap deflection. However, for the inner sector, where the horizontal stabilizer is located aft of the wing, another effect dominates, which causes a pitch up moment. Due to the increased lift, the flap deflection generates increased downwash, i. e., a downwards movement of the airflow. Subsequently, a downwards force at the elevator is generated, which generates a pitch up moment. As a consequence, flap deflection at the outer wing causes a pitch down moment, while at the inner wing the pitch up moment dominates. By using both, the outer and the inner control surfaces, large parts of the effects cancel out.

The flight controller Pixhawk 120 is an open hardware and open software project, which is the outcome of a development for many years. The standard control algorithms of the flight stack ArduPilot aren't used at all. However, the rest of the framework, like scheduling, sensor and actuator communication, and the flight state estimations are used without further modifications.

The development of the control concept can be performed with the assistance of various simulation tools. The advantage of simulation is to have full access to all quantities, the easy adjustment of parameters, and the possibility to step by step add effects such as noise and disturbances, e. g., wind. In addition to engineering tools like Matlab/Simulink, the following tools can be used. By use of Software-In-The-Loop (SITL) simulation with X-Plane not only the aircraft dynamics can be simulated, but also the behavior of the flight controller Pixhawk. Thus, instead of Matlab functions, a C++ code can be implemented, which is already part of the flight stack ArduPilot. By connecting the physical remote control to the computer, which runs the SITL and X-Plane, the actual flight conditions of a real test flight can be simulated.

The last step to validate the function of the control concept before real test flights is to include also the real hardware (Hardware-In-The-Loop (HITL) simulation with X-Plane). Therefore, via USB the flight controller Pixhawk can be connected to the computer which runs X-Plane. The control inputs and flight states are exchanged via UDP packages. Instead of values of the real sensors, e. g., the calculated position of the GPS module, the values from simulation are used.

The simulation delivers good results which are validated with the real set-up. The basic control concept simulated with a real size Cessna C172 is the same as for the test flights with the model aircraft Piper PA18. The inner loop controllers and the geometric properties are adjusted to fit to the real size airplane. As the PFC is based on abstract kinematic quantities such as accelerations, the concept can be applied independently of the aircraft size. Only the achievable bandwidth of the inner loop control and characteristics like stall speed, maximum airspeed, and acceleration restrictions depend on the specific type of aircraft. Simulations with an Airbus A320 and a Boeing B737 show that the control concept can also be applied on airliner effectively.

For modelling the fixed wing aircraft dynamics, the aircraft is considered to be a rigid body. Two reference frames are used. Firstly, the inertial frame (Index I) is defined according to the North-East-Down coordinate system, which is also known as local tangent plane (LTP). It has a fixed origin on the surface of the earth with the x-axis to the North, y-axis to the East, and the z-axis according to a right-handed system pointing Down. Secondly, the body reference frame (Index B) is chosen to have its origin at the center of gravity of the aircraft with the x-axis in longitudinal direction, the y-axis in lateral direction pointing to the right wing, and the z-axis in vertical direction pointing down.

By representing the acting forces $f_B$ and torques $\tau_B$ in the body reference frame, the state space model of a rigid body can be found as $$\dot{r}_I = R_I^B(\varphi, \theta, \psi) v_B \tag{1}$$

$$\dot{v}_B = \frac{1}{m}(f_B - \omega_B \times (m v_B)) \tag{2}$$

$$\dot{\vartheta}_{RPY} = R_{RPY}^B(\varphi, \theta, \psi) \omega_B \tag{3}$$

$$\dot{\omega}_B = I_B^{-1}(\tau_B - \omega_B \times (I_B \omega_B)), \tag{4}$$

where $r_I = [x_I\ y_I\ z_I]^T$ is the position represented in the inertial reference frame, $v_B$ the velocity represented in the body reference frame, $\vartheta_{RPY} = [\varphi\ \theta\ \psi]^T$ the orientation expressed in Roll-Pitch-Yaw representation $\omega_B = [\omega_{xB}\ \omega_{yB}\ \omega_{zB}]^T = [p\ q\ r]^T$ the angular rates represented in the body reference frame, $R_I^B$ the transformation matrix from the body frame to the inertial frame, $R_{RPY}^B$ the transformation matrix from the body angular rates to Roll-Pitch-Yaw rates, $I_B$ the moments of inertia represented in the body reference frame, and m the mass of the aircraft.

The body forces $f_B$ basically consist of lift L, drag D, side force SF, and gravity, which need to be oriented correctly. One example, which will be used below is the equation for modelling the lift force L $$L = c_L \frac{\rho}{2} V_A^2 S; \quad (5)$$

$$c_L \approx c_{L0} + c_{L,\alpha}\alpha + c_{L,q}q + c_{L,\delta_E}\delta_E + c_{L,\delta_F}\delta_F, \quad (6)$$

where $\rho$ denotes the air density, $V_A$ the true airspeed, S the wing area, and $c_L$ the lift coefficient. The latter is usually approximated using an affine representation of the angle of attack $\alpha$, the angular rate q, and the deflections of the elevator $\delta_E$ and of the flaps $\delta_F$.

In general, the dynamics of a specific aircraft design result from the dependencies of the acting forces $f_B$ and torques $\tau_B$ on the 12 rigid body states $r_I$, $v_B$, $\vartheta_{RPY}$, $\omega_B$, and the physical inputs $\delta_A$, $\delta_E$, $\delta_F$, $\delta_R$, $\delta_T$ being given by aileron deflection, elevator deflection, flap deflection, rudder deflection and throttle actuation. Aileron deflection $\delta_A$ in first place results in a roll moment, a torque about the body x-axis. Thus, it is used to influence the roll rate and subsequently the roll angle. Parasitic effects are drag variation and yawing moments.

Elevator deflection $\delta_E$ in first place results in a pitch moment, a torque about the body y-axis. Thus, it is used to influence the angle of attack and subsequently the lift, or the pitch rate and subsequently the pitch angle. Parasitic effects are forces in direction of the vertical axis, which are necessary to generate the pitch moment and add to the lift of the wings. Depending on whether the horizontal stabilizer is a tailplane or a foreplane, the parasitic force decreases or increases the lift. In the case of a frequently used tailplane, the resulting lift force results to have a non minimum-phase characteristic.

Flap deflection $\delta_F$ in first place results in additional lift and to some extent additional drag. Parasitic effects are pitch moments. Thus conventionally, flaps are used during take-off and landing to increase lift for reducing the airspeed. Furthermore, the additional drag can be desirable to decelerate and it allows for steeper approach angles without exceeding speed limitations. In this disclosure, flap deflection is used as primary control input for the variation of lift and therefore vertical acceleration.

Rudder deflection $\delta_R$ in first place results in a yaw moment, a torque about the body z-axis. Thus, it is used to influence the side slip angle and subsequently the side force, or the yaw rate and subsequently the yaw angle. Parasitic effects are roll moments and a parasitic side force, which is necessary to obtain the yaw moment.

In cruise flight the rudder is primarily used to maintain a coordinated flight, i. e., zero side force, indicated in the cockpit by an inclinometer called slip indicator. In the final phase of a landing procedure, the rudder is used for yaw control to align the aircraft with the runway centerline.

Throttle actuation $\delta_T$ in first place results in a thrust variation, i. e., force in longitudinal direction. Parasitic effects are roll, pitch, and yaw moments and lift variation.

The inputs $\delta_A$, $\delta_E$, $\delta_F$, $\delta_R$ are normalized to [−1, 1]. $\delta_T$ is normalized to [0, 1].

The aircraft dynamics of order twelve can be separated into 6 longitudinal states, according to dynamic modes in the longitudinal plane, and six lateral-directional states, resulting in dynamic modes orthogonal to the longitudinal plane.

The phugoid mode (longitudinal, order 2) is basically an interchange of kinetic energy and potential energy causing airspeed and altitude variations. It can be illustrated by observing one oscillation period. Starting when the altitude is highest, the velocity is smallest, which causes a lack of lift. Thus, altitude decreases, which causes a raise in velocity and therefore lift. In further consequence, due to the increasing lift the aircraft starts to climb again. Finally, the altitude is maximal at the end of one period again. The pitch angle also changes due to the up- and downwards varying flight path, while the angle of attack variation is only small. The period length is in the order of 60 s for civil airplanes and 10 s for smaller UAVs, mainly depending on the airspeed, and usually the phugoid mode is weakly damped.

The short-period mode (longitudinal, order 2) is essentially an angle of attack oscillation caused by a resetting torque towards the equilibrium angle of attack, which can be influenced by elevator deflection $\delta_E$. The period length is in the order of a few seconds for civil airplanes and of 0.5 s for smaller UAVs. This mode is usually considerably damped, i. e., it shows small overshoots only.

The roll mode (lateral, order 1) is caused by the damping of the roll rate, the angular rate about the longitudinal axis. For constant aileron deflection $\delta_A$, the roll rate is approaching a magnitude where input torque caused by aileron deflection equals the counteracting damping torque.

The spiral mode (lateral, order 1) is describing the behavior of the aircraft to regain straight flight conditions after a roll angle perturbation or to further increase the roll angle, resulting in a spiral dive. Depending on the aircraft design this mode can be stable or unstable. However, it exhibits a long time constant for usual aircraft designs.

The Dutch roll mode (lateral, order 2) is basically a combined yaw and roll oscillation. The period length and damping varies depending on the aircraft design. In civil aviation a weakly damped Dutch roll mode must be corrected by a yaw-damper.

The remaining 4 states can be considered to be pure integrators, as the aircraft dynamics are independent of its position on the earth and the direction it is flying to. The altitude of flight, i. e., $-z_I$, has got an influence on the air density and therefore on all aerodynamic forces. However, the dynamics are significantly slower than the mentioned aircraft dynamics. Thus, it can be considered as a slowly varying parameter.

The following reduction of the system with 12 states to a kinetic model with 6 states is based on the following assumptions of a reduced translational kinetic model. Neglecting the dynamics of how the forces thrust T, drag D, lift L and the roll angle $\varphi$ originate. This must be justified by using inner loop controllers which are considered to be sufficiently faster than the outer loop. The thrust T acts perfectly opposite to the drag D, i. e., the effective force in flight direction is T−D. In reality, depending on the angle of attack and the mounting of the propulsion unit, the effective direction of thrust force may not be aligned exactly opposite to the drag. The flight state is coordinated, i. e., the side force $\delta F$ is zero. Hence, to obtain lateral forces in the inertial frame a rotation by $\varphi$ is required which results in a lateral component of lift L. Only steady wind is considered, i. e., for the wind velocity holds $v_W \approx$const. Highly dynamic changes of wind in turbulent air are considered to act as external disturbance forces and torques. The inertial velocity $v_I$ can be expressed as the sum of in-air-velocity $v_A$ and wind velocity $v_I = v_A + v_W$ and $$\frac{dv_I}{dt} = \frac{dv_A}{dt}.$$

Henceforth, the index A indicates a representation with reference to the uniformly moving air mass. As the wind is considered to be constant, the transformation from $v_I$ to $v_A$ is Galilean.

The velocity vector with reference to the uniformly moving air mass $v_A$ is described in the inertial frame using spherical coordinates $$v_A = \begin{bmatrix} V_A \cos(\gamma_A)\cos(\psi_A) \\ V_A \cos(\gamma_A)\sin(\psi_A) \\ -V_A \sin(\gamma_A) \end{bmatrix}, \tag{7}$$

where $V_A$ denotes the Euclidean norm $\|v_A\|_2$, $\gamma_A$ the climb angle and $\psi_A$ the in-air flight direction of the aircraft. With the gravitational acceleration g, the derivatives can be found as $$\frac{dV_A}{dt} = \frac{T-D}{m} - g\sin(\gamma_A) \tag{8}$$

$$\frac{d\gamma_A}{dt} = \frac{L\cos(\varphi) - mg\cos(\gamma_A)}{mV_A} \tag{9}$$

$$\frac{d\psi_A}{dt} = \frac{L\sin(\varphi)}{mV_A\cos(\gamma_A)} \tag{10}$$

To obtain the derivative of the inertial position $r_I$, i. e., the velocity with reference to the inertial frame $v_I$, the steady wind velocity $v_W \approx$ const. is taken into account, resulting in $$\frac{dr_I}{dt} = v_I = v_A + v_W \tag{11}$$

$$\frac{d^2 r_I}{dt^2} = \frac{dV_A}{dt} = \frac{\partial v_A}{\partial V_A}\frac{dV_A}{dt} + \frac{\partial v_A}{\partial \gamma_A}\frac{d\gamma_A}{dt} + \frac{\partial v_A}{\partial \psi_A}\frac{d\psi_A}{dt}. \tag{12}$$

Inserting (8, 9, and 10) into (12) one obtains the following representation:

$$\frac{d^2 r_I}{dt^2} = \begin{bmatrix} 0 \\ 0 \\ g \end{bmatrix} + D(\gamma_A, \psi_A)\frac{1}{m}\begin{bmatrix} T-D \\ L\sin(\varphi) \\ L\cos(\varphi) \end{bmatrix} \tag{13}$$

$$D(\gamma_A, \psi_A) = \begin{bmatrix} \cos(\gamma_A)\cos(\psi_A) & -\sin(\psi_A) & -\sin(\gamma_A)\cos(\psi_A) \\ \cos(\gamma_A)\cos(\psi_A) & \cos(\psi_A) & \sin(\gamma_A)\sin(\psi_A) \\ -\sin(\gamma_A) & 0 & -\cos(\gamma_A) \end{bmatrix}. \tag{14}$$

The calculated state space model consists of 6 translational states, $r_I$ and $v_I$. The dynamics depend on the force inputs and their orientation due to $\varphi$, $\gamma_A$, and $\psi_A$. $\gamma_A$, and $\psi_A$ describe the orientation of $v_A = v_I - v_W$, they implicitly depend on $v_I$ and $v_W$. D being a rotation matrix of $\psi_A$ and $\theta_A$, D is an orthogonal matrix, implying det(D)=1. Therefore, D is regular for arbitrary $\psi_A$ and $\gamma_A$. As a first result, the aspired reduced translational kinetic model is found as (13 and 14).

Based on the assumption that due to the inner loop controllers T, L, and $\varphi$ can be manipulated independently, and m, g, D, $\gamma_A$, and $\psi_A$ are known, the following transformation is made $$\begin{bmatrix} \tilde{T} \\ \tilde{L}_S \\ \tilde{L}_C \end{bmatrix} = \begin{bmatrix} T-D \\ L\sin(\varphi) \\ L\cos(\varphi) \end{bmatrix} = mD(\gamma_A, \psi_A)^{-1}\left(\begin{bmatrix} 0 \\ 0 \\ -g \end{bmatrix} + u\right) \tag{15}$$

This results in an exact linear behavior of the plant and reduces (13 and 14) to $$\frac{d^2 r_I}{dt^2} = u. \tag{16}$$

The actual desired values T, L, and $\varphi$ to be realized by the inner control loops can be calculated as $$T = \tilde{T} + D \tag{17}$$

$$L = \sqrt{\tilde{L}_C^2 + \tilde{L}_S^2} \tag{18}$$

$$\varphi = \arctan\left(\frac{\tilde{L}_S}{\tilde{L}_C}\right) \tag{19}$$

Hence, for transforming desired Cartesian accelerations u into $[T\ L\ \varphi]^T$, it is important to have accurate estimations of D, $\gamma_A$, $\psi_A$, and m.

The assumption of zero side force, corresponding to a suitably specified yaw angle, and freely definable roll angle implicates neglecting the Dutch roll mode, the roll mode, and the spiral mode. The assumption of freely definable L, corresponding to a suitably specified pitch angle, implicates neglecting the short-period mode. Hence, in total 4 lateral states and 2 longitudinal states are reduced to obtain a pure translational kinetic model. Thus, the reduction in states can be interpreted as neglecting the angular orientation of the aircraft, which determines the aerodynamic forces, and only consider the states of translation.

Being an interchange of potential energy, correlated to the state $z_I$, and kinetic energy, correlated to the velocity $v_I$, the states of the phugoid mode are still part of the reduced kinetic model (13 and 14). This can be seen by specifying the lift L in (8, 9, 10) to be $L = c_{L0} V_A^2$, $c_{L0} =$ const., and thrust T=D, i. e., T compensates for dissipative drag D, resulting in $$\frac{dV_A}{dt} = -g\sin(\gamma_A) \tag{20}$$

$$\frac{d\gamma_A}{dt} = \frac{c_{L0}v_A^2\cos(\varphi) - mg\cos(\gamma_A)}{mV_A} \tag{21}$$

$$\frac{d\psi_A}{dt} = \frac{c_{L0}v_A^2\sin(\varphi)}{mV_A\cos(\gamma_A)} \tag{22}$$

For initial straight and level flight, i. e., $\varphi = 0$ and the initial values $\gamma_{A0} = 0$ and arbitrary $\psi_{A0}$, the equilibrium airspeed results as $V_{A0}$ according to $L = mg = c_{L0} V_{A0}^2$. With $\Delta V_A = V_A - V_{A0}$, $\Delta \gamma_A = \gamma_A - \gamma_{A0}$, and $\Delta \psi_A = \psi_A - \psi_{A0}$, linearizing the dynamics (8, 9, 10) results in $$\frac{d\Delta V_A}{dt} = -g\Delta\gamma_A \quad (23)$$

$$\frac{d\Delta\gamma_A}{dt} = \frac{2g}{V_{A0}^2}\Delta V_A \quad (24)$$

$$\frac{d\Delta\psi_A}{dt} = 0. \quad (25)$$

This is the characteristic form of an oscillator. For having compensated the only dissipative force D, the oscillation is undamped. With g=9.81 m/s², the oscillation period, is $$T_{ph}(V_{A0}) = \frac{\sqrt{2}\pi}{g}V_{A0} = 0.453\frac{s^2}{m}V_{A0}. \quad (26)$$

The presented reduced kinetic model (13 and 14) can be of interest for airliners, where angle of attack α and side slip angle β are measured and therefore $\gamma_A$ and $\psi_A$ can be calculated for known orientation of the aircraft. Furthermore, in many cases thrust T of the propulsion system can be determined and accurate models for estimating lift L and drag D exist. Without the knowledge of these quantities, (15) and (17, 18, 19) can't be calculated.

For not having available an accurate angle of attack and side slip angle measurement in low-cost UAVs, like the fixed wing aircraft used in this work for the validation of the PFC-concept, and most general aviation aircraft, the concept can't be used in this manner. Thus, the kinetic model (13 and 14) is adapted hereinafter, pursuing the idea of neglecting the dynamics of orientation to obtain a purely translational kinematic model.

In the following a Reduced Translational Kinematic Model is introduced. If angle of attack and side slip angle measurements, necessary for the calculation of $\gamma_A$ and $V\psi_A$, and knowledge of T, D, and L are not available, a further simplification can be done by considering only the resulting accelerations with reference to the body frame $a_B=[a_{xB}\ a_{yB}\ a_{zB}]^T$ to be freely definable. Thus, the main difference to the above is firstly the use of desired accelerations instead of desired forces as inputs to the system. Secondly, the accelerations are oriented along the body axes instead of the air flow axes. For example, the lift L is defined to be orthogonal to the undisturbed air flow pointing up, while $a_{zB}$ is defined orthogonal to the longitudinal body axis pointing down. In general, the two directions differ, e. g., due to the angle of attack.

The derivation is based on the following assumptions. Neglecting the dynamics of how the accelerations $a_{xB}$, $a_{zB}$ and the roll angle φ originate. This must be justified by using inner loop controllers, that are considered to be sufficiently faster than the outer loop. The flight state is coordinated, i. e., $a_{yB}=0$. Hence, to obtain lateral forces in the inertial frame a rotation by φ is required which results in a lateral component of $a_{zB}$. Only steady wind $v_w \approx$ const. is considered. $a_{zB}$ complies with accelerations measured by the utilized accelerometers which are not capable of measuring gravity, as discussed. Thus, the total acceleration acting on the aircraft is $a_I=g+R_I^B a_B$, with $g=[0\ 0\ g]^T$.

By splitting $R_I^B$ into $D(\theta,\psi)$ and a canonical rotation about the body x-axis by φ, the kinematic model results as $$\frac{d^2r_I}{dt^2} = \begin{bmatrix} 0 \\ 0 \\ g \end{bmatrix} + D(\theta,\psi)\begin{bmatrix} a_{xB} \\ a_{zB}\sin(\varphi) \\ a_{zB}\cos(\varphi) \end{bmatrix} \quad (27)$$

$$D(\theta,\psi) = \begin{bmatrix} \cos(\theta)\cos(\psi) & \sin(\psi) & \sin(\theta)\cos(\psi) \\ \cos(\theta)\sin(\psi) & -\cos(\psi) & \sin(\theta)\sin(\psi) \\ -\sin(\theta) & 0 & \cos(\theta) \end{bmatrix}. \quad (28)$$

The hereby found kinematic model will also be the chosen representation for the design of the path following control and the flight tests with the fixed wing UAV. For D being a rotation matrix of yaw rotation ψ and thereafter pitch rotation θ, D is an orthogonal matrix, implying det(D)=1. Therefore, D is regular for arbitrary yaw and pitch angles.

Based on the assumption that due to the inner loop controllers $a_{xB}$, $a_{zB}$, and φ can be manipulated independently, the following transformation is made $$\begin{bmatrix} a_{xB} \\ a_{zB,S} \\ a_{zB,C} \end{bmatrix} = \begin{bmatrix} a_{xB} \\ a_{zB}\sin(\varphi) \\ a_{zB}\cos(\varphi) \end{bmatrix} = D(\theta,\psi)^{-1}\left(\begin{bmatrix} 0 \\ 0 \\ -g \end{bmatrix} + u\right). \quad (29)$$

This results in an exact linear behavior of the plant and reduces (27 and 28) to $$\frac{d^2r_I}{dt^2} = u \quad (30)$$

The actual desired values $a_{zB}$ and φ to be realized by the inner control loops can be calculated as $$-a_{zB} = \sqrt{a_{zB,C}^2 + a_{zB,S}^2} \quad (31)$$

$$\varphi = \arctan\left(\frac{a_{zB,S}}{a_{zB,C}}\right) \quad (32)$$

To maintain the analogy to the lift L, mostly, $-a_{zB}$ will be used instead of $a_{zB}$. $-a_{zB}$ is claimed to be positive, which means, that desired accelerations below weightlessness aren't considered in this work. φ is claimed to fulfill $$|\varphi| < \frac{\pi}{2},$$

which means that inverted flight isn't considered either. Therefore, the solution of (31 and 32) is unambiguous.

Finally, with (27 and 28) and the transformations (29), (31) and (32), a representation of a fixed wing aircraft is found, which perfectly suits for a path following control on the output $r_I$ by means of inner loop controllers for $a_{xB}$, $a_{zB}$, φ, and $a_{yB}$, which shall be zero for a coordinated flight.

The following aims to design inner loop controllers to reduce the dynamics of a fixed wing aircraft to the fundamental kinematic ones. The basic idea is to use directly measurable quantities like angular rates and accelerations to obtain high bandwidth reference tracking and disturbance rejection. This approach proves to be effective when disturbances are hard to model or are unknown as it is the case, e. g., for sticking friction. In this context, by measuring acceleration and designing a feedback control on the actuation force, the mentioned nonlinear dynamics can be drastically simplified. The desired values $\varphi^{des}$, $\theta^{des}$, $a_{zB}^{des}$, $a_{yB}^{des}$, $V_A^{des}$ from the outer loop are transformed to the control inputs $\delta_A, \delta_E, \delta_F, \delta_R, \delta_T$. The measured quantities $V_A$, $\omega_{xB}, \omega_{yB}, a_{zB}, a_{yB}, a_{xB}$ are another input for the corresponding controller, but are not indicated explicitly. The roll angle $\varphi$ and pitch angle $\theta$ are not measured directly but estimated by the extended Kalman filter.

1. a) Identify the transfer function from $\delta_A$ to $\omega_{xB}$, i.e., $P_{\omega_{xB}} = \dfrac{\hat{w}_{xB}}{\hat{\delta}_A}$ b) Design a controller $C_{\omega_{xB}}$ to stabilize $C_{\omega_{xB}} P_{\omega_{xB}}$ by closing the feedback loop with the measurement $\omega_{xB}$.

c) Design a controller $C_\varphi$, to stabilize $C_\varphi P_\varphi$, with $$P_\varphi = \dfrac{\hat{\varphi}}{\hat{\omega}_{xB}^{des}}.$$

2. a) Identify the transfer function from $\delta_E$ to $\omega_{yB}$, i.e., $P_{\omega_{yB}} = \dfrac{\hat{w}_{yB}}{\hat{\delta}_E}$ b) Design a controller $C_{\omega_{yB}}$ to stabilize $C_{\omega_{yB}} P_{\omega_{yB}}$ by closing the feedback loop with the measurement $\omega_{yB}$.

c) Design a controller $C_\theta$ to stabilize $C_\theta P_\theta$, with $$P_\theta = \dfrac{\hat{\theta}}{\hat{\omega}_{yB}^{des}}.$$

3. a) Identify the transfer function from $\delta_F$ to $a_{zB}$, i.e., $P_{a_{zB}} = \dfrac{\hat{a}_{zB}}{\hat{\delta}_F}$.

b) Design a controller $C_{a_{zB}}$ to stabilize $C_{a_{zB}} P_{a_{zB}}$ by closing the feedback loop with the measurement $a_{zB}$.

4. a) Identify the transfer function from $\delta_R$ to $a_{yB}$, i.e., $P_{a_{yB}} = \dfrac{\hat{a}_{yB}}{\hat{\delta}_R}$.

b) Design a controller $C_{a_{yB}}$ to stabilize $C_{a_{yB}} P_{a_{yB}}$ by closing the feedback loop with the measurement $a_{yB}$.

5. a) Identify the transfer function from $\delta_T$ to $a_{xB}$, i.e., $P_{a_{xB}} = \dfrac{\hat{a}_{xB}}{\hat{\delta}_T}$.

b) Design a controller $C_{a_{xB}}$ to stabilize $C_{a_{xB}} P_{a_{xB}}$ by closing the feedback loop with the measurement $a_{xB}$.

c) Design a controller $C_{V_A}$, to stabilize $C_{V_A} P_{V_A}$, with $$P_{V_A} = \dfrac{\hat{V}_A}{\hat{a}_{xB}^{des}}$$

In the above, the Laplace variable s is omitted for clarity, e.g., $P_{\omega_{xB}}$ represents $P_{\omega_{xB}}(s)$. The Laplace transform of quantities, which are also discussed in the time domain, is indicated by a hat symbol above the variable, e.g., $\hat{\omega}_{xB}$. The variable and additional index z, e.g., $P_{z,\omega_{xB}}$, indicates the time discrete domain. Analogously, the variable and the additional index q, e.g., $P_{q,\omega_{xB}}$, indicates the Tustin domain.

The system, which is a solid body in the 3D-space with 6 degrees of freedom with 5 independent control inputs, is almost fully actuated. Especially by also using the flaps as dynamic input rather than only for take-off and landing, the longitudinal subsystem is fully actuated, i.e., the 3 longitudinal degrees of freedom $x_I, z_I, \theta$ have the same number of independent inputs $\delta_E, \delta_F, \delta_T$. Consequently, the lateral subsystem with the degrees of freedom $y_I, \varphi, \psi$ is missing one input to be fully actuated. $\delta_A$ primarily generates a roll moment to control $\omega_{xB}$ and in further consequence $\varphi$. $\delta_R$ can be either used to control $\omega_{zB}$ and in further consequence the yaw angle $\psi$, or to control $a_{yB}$ by influencing the side slip angle $\beta$. During cruise flight, coordinated flight is achieved by $a_{yB}=0$. On the contrary, for landing the alignment along the runway center line with orientation $\psi_{RW}$ is important, i. e., $\psi=\psi_{RW}$. As landing is not considered in this work, $\delta_R$ will be used to maintain coordinated flight, thus, will be used to control $a_{yB}$. Therefore, $\omega_{zB}$ is specified by the desired values of $a_{xB}, a_{yB}, a_{zB}, \omega_{xB}, \omega_{yB}$, i. e., cannot be controlled independently, as the system is underactuated.

To obtain a fully actuated system, another input which directly generates side force would be necessary, e.g., kind of a wing in vertical direction equipped with flaps. Consequently, a similar control concept as it will be demonstrated for the longitudinal system could also be implemented for the lateral system. A direct side force control and direct lift control can be used to control forces independently from orientation and to improve the dynamic response of the forces. For direct lift control by means of flap actuation, the actuation time is the limiting factor how fast lift can be changed. For state of the art airliners the flaps usually are only used for long-term modification of the lift characteristics, thus, extend slowly. The model aircraft which will be used for validation of the concept is equipped with the same servos for flap actuation as for the other control surfaces. Therefore, highly dynamic flap extension is possible.

An adapted structure is investigated which allows to almost double the performance of the $a_{zB}$ control loop. Instead of the completely decoupled SISO cascades, a dynamic filter output of $\delta_F$ is added to $\delta_E$. Furthermore, $\delta_E$ isn't used to realize $\omega_{yB}^{des}$ anymore but to return $\delta_F$ to its neutral position, e.g., $\delta_F^{des}=0$. Therefore, the inner control loop, where $a_{xB}, a_{yB}, a_{zB}, \omega_{zB}$, and $\omega_{yB}$, are controlled, changes. $\omega_{yB}$ isn't controllable independently anymore but specified by $\delta_F^{des}=0$. Thus, in the final concept, $\omega_{yB}$ and $\omega_{zB}$ aren't controlled but specified by $a_{xB}^{des}, a_{yB}^{des}=0, a_{zB}^{des}, \omega_{xB}^{des}$, and $\delta_F^{des}=0$.

The identification task is accomplished by the application of a chirp signal on the respective input. By means of the identification of the transfer function $P_{\omega_{yB}}$ from the input $\delta_E$ to the output $\omega_{yB}$, the necessary calculations are explained. As it is rarely the case that the air is completely smooth, multiple identification patterns are flown and averaged to reduce the effect of disturbances. Still, a reasonably smooth air is desirable to obtain satisfying results. Another important consideration is the frequency band to be identified which should contain the dynamics of interest. For practical reasons, the time of one pattern is limited to approximately 20 s to keep the aircraft close enough to the remote pilot to maintain visual contact. Therefore, the frequency band shouldn't be chosen too wide, as this would result in weak excitation of the corresponding frequencies. On the other hand, choosing the frequency band too narrow results in only little information about the frequency dependency of the dynamics. It turned out to be a good trade-off to choose one decade in frequency around the area of interest. Another important consideration is the amplitude of the signal. If the amplitude is too large, the state of equilibrium on which the linear identification is based may be left excessively. On the other hand, a very low amplitude doesn't excite the system enough to achieve differentiation from disturbance and noise.

Another important precondition for the identification process is the chosen equilibrium state on which the chirp signal is superposed. This information is specified for each identification procedure. In case of the identification of $P_{\omega_{yB}}$ the point of equilibrium and the task of the other controllers during the identification is given in FIG. 2. As $\omega_{yB}$ represents a longitudinal state, lateral dynamics are suppressed by maintaining coordinated, straight flight, i. e., $a_{yB}$=0 m/s$^2$ and wings leveled, i. e., $\varphi$=0 rad. As the control action of the $V_A$-control could have parasitic effects on the identification, during the identification pattern throttle is kept constant, i. e., $\delta_T=\delta_{T,0}$=const. The value $\delta_{T,0}$ is determined by an online low-pass filter of first order of $\delta_T$, which determines the mean value before the start. For $\omega_{yB}$-control, the flaps aren't used and kept at 0. The identification input $\delta_{E,ID}$ consists of the chirp signal itself, a trim value $\delta_{E,0}$, determined analogously to $\delta_{T,0}$, and the possibility of additional manual input. The controllers for $\varphi$, $\theta$, $a_{yB}$, and $V_A$ can be the result of a preceding controller design or manually tuned PI-controllers.

The response is analyzed in the discrete time domain by assuming a transfer function of third order. This order may be different for the transfer functions of the other identification procedures. In the case of $P_{\omega_{yB}}$ it is expected to be identified in the region of the short-period mode, an oscillation of second order. Additionally, the bandwidth of reference tracking of the servos is limited to similar frequencies, which is taken into account by another state. Thus, the structure of the time-discrete plant can be written as $$P_{z,\omega_{yB}}(z) = \frac{b_1 z^{-1} + b_2 z^{-2} + b_3 z^{-3}}{1 + a_1 z^{-1} + a_2 z^{-2} + a_3 z^{-3}} \quad (33)$$

With $T_s$=0.02 s, $y_k=\omega_{yB}(kT_s)$, and $u_k=\delta_E(kT_s)$, in the discrete time domain, $P_{z,\omega_{yB}}$ corresponds to $$y_k = b_1 u_{k-1} + b_2 u_{k-2} + b_3 u_{k-3} - a_1 y_{k-1} - a_2 y_{k-2} - a_3 y_{k-3} \quad (34)$$

Based on measured values $y_1, y_2, \ldots, y_{N-1}$ and $u_1, u_2, \ldots, u_{N-1}$, summarized in the data matrix $$s = \begin{bmatrix} -y_3 & -y_2 & -y_1 & u_3 & u_2 & u_1 \\ -y_4 & -y_3 & -y_2 & u_4 & u_3 & u_2 \\ \vdots & \vdots & \vdots & \vdots & \vdots & \vdots \\ -y_{N-1} & -y_{N-2} & -y_{N-3} & u_{N-1} & u_{N-2} & u_{N-3} \end{bmatrix} \quad (35)$$

and with $y=[y_4\ y_5\ \ldots\ y_N]^T$, an optimal solution for the parameter vector $p=[a_1\ a_2\ a_3\ b_1\ b_2\ b_3]^T$, according to the least squares problem $$\min_p (y - y_{est}(p))^T (y - y_{est}(p)), y_{est} = Sp \quad (36)$$

is found to be $$p^* = (S^T S)^{-1} S^T y. \quad (37)$$

Finally, with $p^*=[0.41\ -0.90\ 1.01\ -1.66\ 1.12\ -0.33]^T$ the estimated plant $P_{z,\omega_{yB}}$ can be written as $$P_{z,\omega_{yB}} = \frac{-1.66 z^{-1} + 1.12 z^{-2} - 0.33 z^{-3}}{1 + 0.41 z^{-1} - 0.90 z^{-2} + 1.01 z^{-3}}. \quad (38)$$

In the following the procedure how the linear controllers are designed is shown. As an example, the cascaded pitch-controller to track a reference input $\theta^{des}$ for the pitch angle is considered. The inner loop controller $C_{\omega_{yB}}$ generates the desired value of elevator deflection $\delta_E$, which is realized by a servomotor, to track the desired rate $\omega_{yB}^{des}$ of the higher-level controller $C_\theta$.

The design of $C_{\omega_{yB}}$ is based on the beforehand identified plant $P_{z,\omega_{yB}}$. By applying the bilinear transformation $$P_{q,\omega_{yB}}(q) = \frac{-0.5571 q^3 + 84.66 q^2 - 4150 q - 1.255 \cdot 10^5}{q^3 + 59.29 q^2 + 2774 q + 4.567 \cdot 10^4}. \quad (39)$$

to (38), the representation of the system in the Tustin domain is determined as $$z = \frac{1 + qT_s/2}{1 - qT_s/2}$$

For this plant a PI-controller is designed by using two tuning parameters $\omega_{0dB}$ and $\omega_P$ in the form $$C_{q,\omega_{yB}}(q) = V(\omega_{0dB}) \frac{1 + \frac{q}{\omega_P}}{q}. \quad (40)$$

The parameter $\omega_{0dB}$ determines the frequency where the open loop transfer function $L_{q,\omega_{yB}} = C_{q,\omega_{yB}} P_{q,\omega_{yB}}$ is supposed to cross the 0 dB level. The gain factor $V(\omega_{0dB})$ is adjusted to achieve this property. $\omega_{0dB}$ roughly characterizes the bandwidth. $\omega_p$ specifies the root of the nominator of $C_{q,\omega_{yB}}(q)$ and therefore the frequency, where integral-dominant action changes to proportional-dominant action, i.e., where a phase-shift of $-90°$ changes to $0°$.

A good trade-off between bandwidth and robustness is found for $\omega_{0dB}$=9 rad/s and $\omega_p=3\omega_{0dB}$=27 rad/s. Thus, at $\omega_{0dB}$ the integral action of the PI-controller dominates, which is necessary to obtain a slope of $-20$ dB per decade due to the almost constant magnitude of the plant $P_{z,\omega_{yB}}$ itself. The $-20$ dB slope is a design criterion which is required to avoid creeping settling of the controlled quantity to the desired reference value. The gain factor $V(\omega_{0dB})$ follows as $$\left|L_{q,\omega_yB}(j\omega_{0dB})\right| = V(\omega_{0dB})\left|\frac{1+\frac{j\omega_{0dB}}{\omega_p}}{j\omega_{0dB}}P_{q,\omega_yB}(j\omega_{0dB})\right| \stackrel{!}{=} 1 \quad (41)$$

$$V(\omega_{0dB})\left|\frac{1+\frac{j\omega_{0dB}}{\omega_p}}{j\omega_{0dB}}P_{q,\omega_yB}(j\omega_{0dB})\right|^{-1} = 3.265. \quad (42)$$

Thus, the controller in the Tustin domain results as $$C_{q,\omega_yB}(q) = 3.265\frac{1+q/\left(27\frac{\text{rad}}{s}\right)}{q}. \quad (43)$$

At $\omega_{0dB}$ the magnitude is confirmed to be 1 while the phase plot shows a phase reserve $\phi_{0dB}=180°-119.530=60.470$. By applying the inverse bilinear transformation $$q = \frac{2}{T_s}\frac{z-1}{z+1},$$

the corresponding representation in the discrete time domain is found to be $$C_{z,\omega_yB} = k_P + k_I\frac{T_s}{z-1}, k_P = 0.1536, k_I = 3.2648 \quad (44)$$

For a simulated closed loop step response for $\omega_{yB}^{des}=1$ rad/s, the controller effort of elevator deflection $\delta_E$ shows a steady state value of 0.364 and a maximum value of 0.4. Thus, assuming linear behavior, the restrictions for the elevator $|\delta_E|\leq 1$ are fulfilled for $$|\omega_{yB}^{des}| \leq \frac{1}{0.4} = 2.5,$$

which will be chosen to be the output restriction for the higher-level controller. Furthermore, the gain factor of $C_{\omega_yB}$ is corrected by the factor $$\frac{V_{ref}}{V_A}$$

according to $V_{ref}=12$ m/s. The transfer function from $\hat{\delta}_E$ to $\hat{\omega}_{yB}$ shows an amplification which is directly proportional to the airspeed $V_A$. This known relation is therefore compensated by the division with $V_A$. The same correction is also done for the roll rate $\omega_{xB}$ for the roll-controller cascade.

For the design of the higher-level controller $C_\theta$, the plant $$P_\theta = \frac{\hat{\theta}}{\hat{\omega}_{yB}^{des}}$$

must be determined. For this purpose, one option is to carry out identification flights with the loop of $C_{\omega_yB}$ closed, $\omega_{yB}^{des}$ as input, and $\theta$ as response for the identification.

Assuming that the performance of the controller $C_{\omega_yB}$ corresponds to the designed one, another possibility exists. For $\varphi=0$ rad, $\omega_{yB}$ is the derivative of $\theta$. For higher bank angles $\varphi\neq 0$ rad, this relation doesn't hold any longer and would have to be corrected. However, the pitch controller is only used for identification maneuvers in straight flight conditions, thus the assumption $$\omega_{yB} = \frac{d\theta}{dt}$$

is justified. Due to $$\omega_{yB} = \frac{d\theta}{dt}, \text{ i.e., } \hat{\theta} = \frac{\hat{\omega}_{yB}}{s}$$

and the assumption that $$T_{\omega_yB} = \frac{\hat{\omega}_{yB}}{\hat{\omega}_{yB}^{des}} = \frac{c_{\omega_yB}P_{\omega_yB}}{1+c_{\omega_yB}P_{\omega_yB}},$$

as designed, the transfer function from $\hat{\omega}_{yB}^{des}$ to $\hat{\theta}$ can be calculated to be $$P_\theta = \frac{\hat{\theta}}{\hat{\omega}_{yB}^{des}} = \frac{\hat{\theta}}{\hat{\omega}_{yB}}\frac{\hat{\omega}_{yB}}{\hat{\omega}_{yB}^{des}} = \frac{1}{s}T_{\omega_yB}, \text{ i.e.,}$$

it can directly be determined by the complementary sensitivity function of the control design of $C_{\omega_yB}$. Analogous considerations can be made for the cascaded controllers $C_\varphi$, $C_{\omega_xB}$, and $C_{V_A}$, $C_{a_xB}$.

Analogously to the PI-controller design of $C_{\omega_yB}$, with $\omega_{0dB}=3$ rad/s and $\omega_p=0.2\omega_{0dB}=0.6$ rad/s, the controller $C_\theta$ results as $$C_{z,\theta} = k_P + k_I\frac{T_s}{z-1}, k_P = 2.9570, k_I = 1.7636. \quad (45)$$

In analogous manner to the identification procedure and design for the pitch-controller cascade, the roll-controller cascade consisting of $C_{\omega_xB}$ and $C_\varphi$ is designed. First of all, the plant $P_{\omega_xB}$ is identified. The chosen equilibrium state and controller conditions before and during the identification pattern can be found in FIG. 3. $\delta_A$ is driven according to the identification pattern and the additional possibility to make manual corrections to keep level flight. $\delta_E$ is controlled to keep a constant pitch angle $\theta^{des}=0$ rad to maintain the equilibrium state. Otherwise, especially for increasing bank angles, the aircraft's nose would drop, which leads to airspeed increase and a spiral turn. $\delta_R$, $\delta_T$ are kept constant during the identification pattern to avoid parasitic effects.

The identified transfer function $P_{z,\omega_xB}$ is $$P_{z,\omega_xB} = \frac{-0.24z^{-1}+0.75z^{-2}-0.17z^{-3}}{1-1.85z^{-1}+1.25z^{-2}-0.30z^{-3}}. \quad (46)$$

Based on this transfer function with $\omega_{0dB}=10$ rad/s and $\omega_P=3\omega_{0dB}=30$ rad/s, a PI-controller $C_{z,\omega_{yB}}$ is designed in the form $$C_{z,\omega_{xB}} = k_P + k_I \frac{T_s}{z-1}, k_P = 0.1278, k_I = 2.9485. \quad (47)$$

For a simulated closed loop step response for $\omega_{xB}^{des}=1$ rad/s, the controller effort of aileron deflection $\delta_A$ shows a steady state value of 0.31 and a maximum value of 0.36. Thus, assuming linear behavior, the restrictions for the aileron $|\delta_A|\leq 1$ are fulfilled for $|\omega_{xB}^{des}|\leq 1/0.36=2.78$, which will be chosen to be the output restriction for the higher-level controller.

The plant P $$P_\varphi = \frac{\hat{\varphi}}{\hat{\omega}_{xB}^{des}}$$

is found in an analogous manner as $P_\theta$. Assuming that the performance of the controller $C_{\omega_{xB}}$ is according to the designed one, and due to $$\omega_{xB} = \frac{d\varphi}{dt}, \text{ i.e., } \hat{\varphi} = \frac{\hat{\omega}_{xB}}{s},$$

the transfer function from $\omega_{xB}^{des}$ to $\varphi$ can be calculated as $$P_\varphi = \frac{\hat{\varphi}}{\hat{\omega}_{xB}^{des}} = \frac{\hat{\varphi}}{\hat{\omega}_{xB}^{des}} \frac{\hat{\omega}_{xB}}{\hat{\omega}_{xB}^{des}} = \frac{1}{s} T_{\omega_{xB}}.$$

Based on this transfer function with $\omega_{0dB}=3$ rad/s and $\omega_p=0.2\omega_{0dB}=0.6$ rad/s, a PI-controller $C_\varphi$ is designed in the form $$C_{z,\varphi} = k_P + k_I \frac{T_s}{z-1}, k_P = 2.9442, k_I = 1.7560. \quad (48)$$

The transfer function from $\hat{\delta}_A$ to $\hat{\omega}_{xB}$ shows an amplification which is directly proportional to the airspeed $V_A$. This known relation is therefore compensated by the division with $V_A$ in the form $$\frac{V_{ref}}{V_A}.$$

An $a_{yB}$-controller is designed for the plant $P_{a_{yB}}$ with the rudder $\delta_R$ as input. FIG. 4 shows the conditions for the identification. The identified transfer function $P_{z,a_{yB}}$ is $$P_{z,a_{yB}} = \frac{-0.43z^{-1} - 1.12z^{-2} + 1.83z^{-3}}{1 - 1.21z^{-1} - 0.035z^{-2} + 0.28z^{-3}} \quad (49)$$

Based on this transfer function with $\omega_{0dB}=2$ rad/s and $\omega_p=3\omega_{0dB}=6$ rad/s, a PI-controller $C_{a_{yB}}$ is designed $$C_{z,a_{yB}} = k_P + k_I \frac{T_s}{z-1}, k_P = 0.0415, k_I = 0.2347. \quad (50)$$

The transfer function from $\hat{\delta}_R$ to $\hat{a}_{yB}$ shows a quadratic dependency on the airspeed $V_A$. This known relation is therefore compensated by the division with $V_A^2$ in the form $$\frac{V_{ref}^2}{V_A^2}.$$

In analogous manner to the identification procedure and design for the pitch-controller cascade, the airspeed-controller cascade consisting of $C_{a_{xB}}$ and $C_{V_A}$ is designed. The chosen equilibrium state and controller conditions before and during the identification pattern can be found in FIG. 16. The plant $P_{a_{xB}}$ is identified as described above.

The identified transfer function $P_{z,a_{xB}}$ is $$P_{z,a_{xB}} = \frac{0.054z^{-1} + 0.44z^{-2} - 0.85z^{-3} + 0.76z^{-4}}{1 - 1.23z^{-1} + 0.41z^{-2} - 0.16z^{-3} + 0.044z^{-4}}. \quad (51)$$

Based on this transfer function with $\omega_{0dB}=10$ rad/s and $\omega_P=3\omega_{0dB}=30$ rad/s, a PI-controller $C_{a_{xB}}$ is designed $$C_{z,a_{xB}} = k_P + k_I \frac{T_s}{z-1}, k_P = 0.1817, k_I = 0.8651. \quad (52)$$

The plant $$C_{V_A} = \frac{\hat{V}_A}{\hat{a}_{xB}^{des}}$$

is found in an analogous manner as $P_\theta$. Assuming that the performance of the controller $C_{a_{xB}}$ is according to the designed one and due to $$a_{xB} = \frac{dV_A}{dt}, \text{ i.e., } \hat{V}_A = \frac{\hat{a}_{xB}}{s},$$

the transfer function from $a_{xB}^{des}$ to $V_A$ can be calculated as $$P_{V_A} = \frac{\hat{V}_A}{\hat{a}_{xB}^{des}} = \frac{\hat{V}_A}{\hat{a}_{xB}} \frac{\hat{a}_{xB}}{\hat{a}_{xB}^{des}} = \frac{1}{s} T_{a_{xB}}.$$

Based on this transfer function with $\omega_{0dB}=1$ rad/s and $\omega_P=0.2\omega_{0dB}=0.2$ rad/s, a PI-controller $C_{V_A}$ is designed $$C_{z,V_A} = k_P + k_I \frac{T_s}{z-1}, k_P = 0.9860, k_I = 0.1968. \quad (53)$$

In the following, a method is developed to control $a_{zB}$ by means of actuating the wing, i. e., $\delta_F$, not only actuates the flaps but also lowers the ailerons. Thus, the curvature of the whole span is changed to influence the aerodynamic accelerations generated by the wing. Further developments could improve this technique by using adaptive materials to change the wing shape more precisely than by means of 3 discrete control surfaces.

Generally, the control design could be done in the same manner as demonstrated above. However, a pitch oscillation of the short-period mode results in an antiresonance of vertical acceleration $-a_{zB}$ when excited by $\delta_F$. If the $\omega_{yB}$ control was fast enough, it would suppress this oscillation. Still, as the performance of the system limits the achievable bandwidth of the $\omega_{yB}$ control, a different method is developed to overcome the antiresonance and therefore improve the performance.

To obtain constant magnification in the control loop, instead of controlling $a_{zB}$ itself the coefficient $$c_{zB} = \frac{a_{zB}}{V_A^2} \frac{V_{ref}^2}{a_{ref}} \tag{54}$$

is calculated, i. e., the quadratic dependency on the airspeed $V_A$ is compensated. Due to scaling with $a_{ref}=g=9.81$ m/s² and $V_{ref}=12$ m/s, at level flight conditions with $V_A=V_{ref}$ follows $-c_{zB}=1$. As for this control concept the indicated airspeed $V_A$ is expected to be always higher than a minimum airspeed $V_A > V_{A,min} > 0$ m/s, the division is well defined. The desired independence of $c_{zB}$ on $V_A$ is confirmed by identification procedures at different airspeeds. To this end, a series of test flights is executed where the response of $c_{zB}$ to the chirp of $\delta_F$ indeed doesn't alter significantly for different airspeeds.

To understand the difference in lift generation due to $\delta_E$ and $\delta_F$ deflection, the model of lift force (5 and 6) is repeated $$L = c_L \frac{\rho}{2} V_A^2 S \tag{55}$$

$$c_L \approx c_{L0} + c_{L,\alpha}\alpha + c_{L,q}q + c_{L,\delta_E}\delta_E + c_{L,\delta_F}\delta_F. \tag{56}$$

The differences between $c_L$ and the introduced $c_{zB}$ are the orientation and a constant scaling factor. Lift L is defined to be orthogonal to the undisturbed airflow and positive in the upwards direction. The body acceleration $a_{zB}$ is orthogonal to the longitudinal body axis and positive to the downwards direction. The different scaling is influenced by the mass m, for L being a force and $a_{zB}$ an acceleration, other factors like wing area S, and the introduced normalization by $a_{ref}$ and $V_{ref}$. For small angles of attack $\alpha$, the fundamental characteristic for lift generation is considered to be similar for $c_L$ and $c_{zB}$, thus, also $c_{zB}$ can be written as $$c_{zB} \approx c_{zB,0} + c_{zB,\alpha}\alpha + c_{zB,q}q + c_{zB,\delta_E}\delta_E + c_{zB,\delta_F}\delta_F. \tag{57}$$

Figure 5:
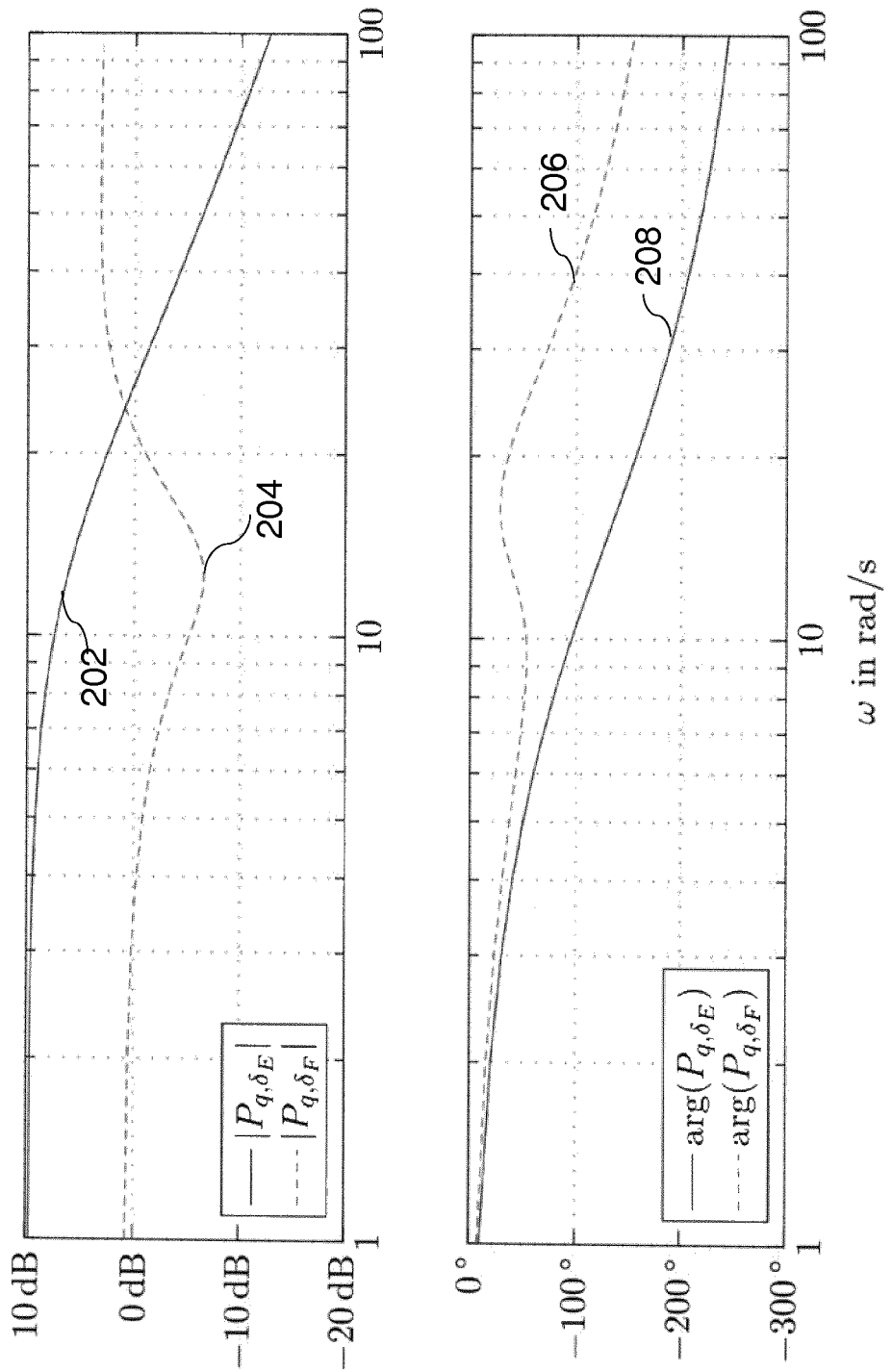
FIG. 5 shows Bode plots of $P_{q,\delta_E}$ and $P_{q,\delta_F}$ from $\delta_E$ and $\delta_F$, respectively, to the response $-c_{zB}$.

Reference is made to FIG. 5. 202 shows $|P_{q,\delta_E}|$, plot 204 shows $|P_{q,\delta_F}|$, plot 206 shows $\arg(P_{q,\delta_F})$ and plot 208 shows $\arg(P_{q,\delta_E})$. By identifying $$P_{\delta_E} = -\frac{\hat{c}_{zB}}{\hat{\delta}_E}$$

with $\delta_F=0$, and $$P_{\delta_F} = -\frac{\hat{c}_{zB}}{\hat{\delta}_F}$$

with $\delta_E=\delta_{E,0}=$const., the main difference of the two methods to generate lift gets obvious.

Figure 6:
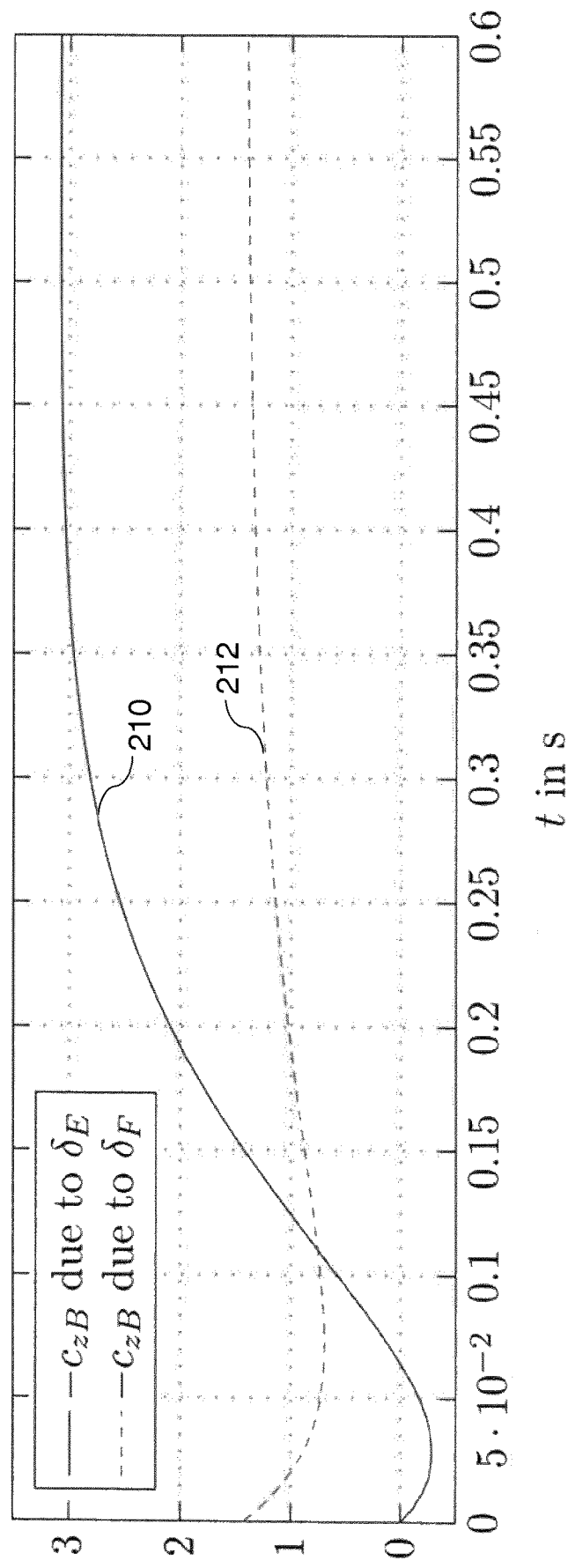
FIG. 6 shows a step response of $-c_{zB}$ due to step input of $\delta_E$ and $\delta_F$, respectively.

Generation of lift by the elevator $\delta_E$ is mainly based on changing the angle of attack $\alpha$, i. e., the effect of $c_{zB,\alpha}\alpha$ dominates. The component $c_{zB,\delta_E}\delta_E$ is a parasitic effect of the elevator due to the force at the horizontal tail, which is necessary to generate the pitching moment to change the angle of attack. In the case of a tailplane, this parasitic force results to be opposite to the resulting lift of the wing. As the dynamics of the force at the tailplane only depend on the actuator of the elevator, while the angle of attack mainly changes according to the short-period mode, a nonminimum phase characteristic can be observed. Therefore, generation of lift by the elevator inevitably entails a lag, which depends on the short-period mode and in case of a tailplane the polarity of the force at first even results to be opposite to the desired one. The simulated step response for the identified transfer function of $-c_{zB}$ excited by $\delta_E$ illustrates this characteristic in FIG. 6, plot 210 shows the step response of $-c_{zB}$ due to step input $\delta_E$ and plot 212 shows the step response of $-c_{zB}$ due to step input of $\delta_F$. FIG. 5 emphasizes the low-pass characteristic of the short-period mode, with a characteristic frequency of $\omega_{SP}=13.15$ rad/s.

Figure 7:
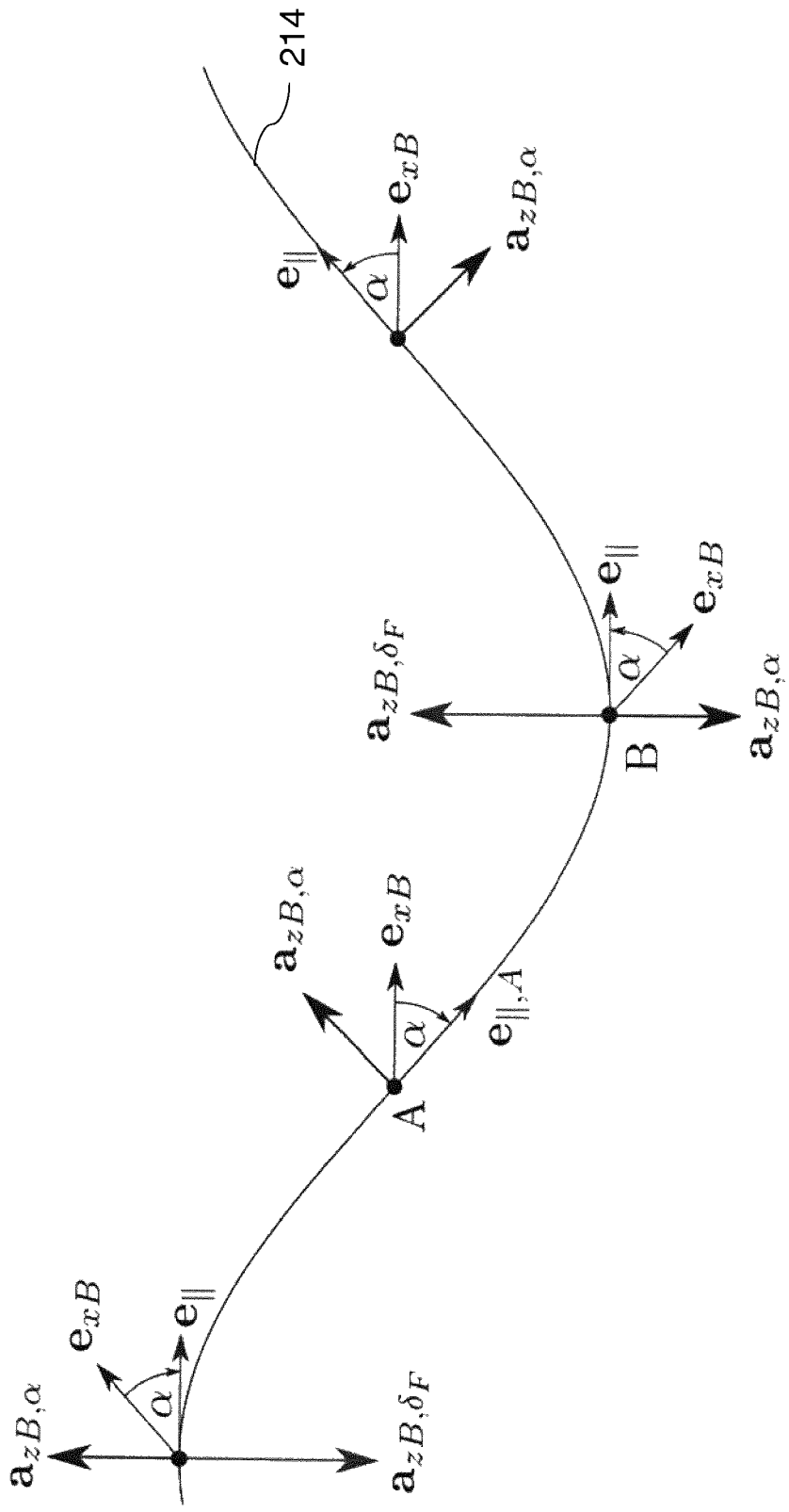
FIG. 7 depicts a trajectory for sinusoidal acceleration $a_{zB}$ and cancellation effect due to short-period mode lag.

Generation of lift by flap deflection $\delta_F$ directly influences the component $c_{zB,\delta_F}\delta_F$ of (57). If no parasitic pitching moment is caused by the wing deformation, the stationary value of the angle of attack $\alpha$ remains the same, i. e., $c_{zB,\alpha}\alpha$ doesn't change for low excitation frequencies. Still a dynamic effect is observed, which causes an $\alpha$ oscillation. This oscillation causes an antiresonance approximately in the region of $\omega_{SP}$ where the short-period mode has got a phase shift of 90°. As illustrated by FIG. 7 this phase shifted $\alpha$ oscillation results in an effect $c_{zB,\alpha}\alpha$ which cancels out part of the desired component $c_{zB,\delta_F}\delta_F$. Namely, if $\delta_F$ by means of $c_{zB,\delta_F}\delta_F$ excites a sinusoidal acceleration $a_{zB,\delta_F}$, a sinusoidal trajectory 214 will set in, where maximum upwards acceleration is found at minimum height at point B in FIG. 7. The direction parallel to the trajectory is indicated by $e_{\|}$. Considering the orientation of the aircraft, for low frequencies the pitch angle follows the change of orientation of the trajectory. This is due to the characteristic of the aircraft to orient into the airflow, i. e., to keep alpha constant. For higher frequencies the aircraft orientation doesn't follow the trajectory direction ideally anymore. According to the decoupling of the short-period mode, the longitudinal axis which is indicated by $e_{xB}$ oscillates with a phase shift, i. e., the orientation of $e_{xB}$ lags behind the orientation of $e_{\|}$. FIG. 7 illustrates this lag of the aircraft's longitudinal direction $e_{xB}$ behind the trajectory direction $e_{\|}$ for a 90° phase shift, which occurs at the resonance frequency of the short-period mode. Therefore, $e_{xB}$ reaches the ideal orientation into the airflow of point A, i. e., the orientation of $e_{\|,A}$, as late as at point B. This causes a negative angle of attack at point B and therefore a downwards acceleration $a_{zB,\alpha}$ which cancels out part of the flap effect $a_{zB,\delta_F}$. The vertical movement in FIG. 7 is overstated to make the effect clear. Also, the rotation of $a_{zB}$ due to the rotated body x-axis $e_{xB}$ isn't illustrated, without affecting the underlying principle. This effect is also confirmed by simulation of a reduced model with the states $\theta$, $\omega_{yB}$, $V_A$, $\gamma_A$. Thereby the longitudinal dynamics, which result in the short-period mode and the phugoid mode can be investigated. $x_I$ and $z_I$ have no influence on the dynamics and can be neglected like the lateral states. As expected, the suppression effect of the antiresonance depends on the damping of the short-period mode which determines the resulting magnitude of the $\alpha$ oscillation in the region of the resonance frequency. The identified plant $$-\frac{\hat{c}_{zB}}{\hat{\delta}_F}$$

shows the described antiresonance in FIG. 5.

FIG. 6 shows the step response of $-c_{zB}$ to a step in $\delta_F$ of the identified plant $P_{\delta_F}$, where higher frequency dynamics have been removed. Therefore, low pass behavior of the sensors and actuators is neglected. This is done to emphasize the potential of immediate response of vertical acceleration by flap deflection. In contrast, the response of $-c_{zB}$ to a step in $\delta_E$ at first shows nonminimal characteristic and due to the short-period mode needs about 0.4 s to rise. This delay in acceleration generation by $\delta_E$ can't be improved by faster actuators, as the aircraft in any case needs to rotate to alter the angle of attack. However, by improving the actuator dynamics of $\delta_F$ as well as the system set-up concerning time delay, a very fast response of vertical acceleration to $\delta_F$ can be achieved. For the given experimental set-up the advantage is limited by the overall time delay of the system. Still, more than double the bandwidth is possible compared to $c_{zB}$ control by $\delta_E$, as long as the antiresonance is compensated.

To achieve this, a dynamic filter is designed to compensate the oscillation by use of $\delta_E$. To this end, the input $\delta_F$ is filtered and the output of the dynamic filter is added to $\delta_E$. Thus, the intention is to reduce the $\alpha$ oscillation by means of anticipating the effect of $\delta_F$ and compensate it using $\delta_E$. Hence, a dynamic filter $F_{\delta_E,\delta_F}$ is designed to compensate the described antiresonance by means of adding a feedforward elevator deflection $\hat{\delta}_{E,FF} = F_{\delta_E,\delta_F}\hat{\delta}_F$ to the control input $\hat{\delta}_E$. Thus, assuming linear superposition, the new resulting transfer function $\tilde{P}_{\delta_F}$ from $\hat{\delta}_F$ to $-\hat{c}_{zB}$ becomes $$-\hat{c}_{zB} = P_{\delta_F}\hat{\delta}_F + P_{\delta_E}\hat{\delta}_{E,FF} = \underbrace{(P_{\delta_F} + P_{\delta_E}F_{\delta_E,\delta_F})}_{\tilde{P}_{\delta_F}}\hat{\delta}_F \quad (58)$$

As ansatz for the filter $F_{\delta_E,\delta_F}$, a linear filter of second order is chosen. As the filter shall only operate at higher frequencies, where the antiresonance appears, the steady state response shall be 0. Thus, the ansatz in the Tustin-domain is $$F_{q,\delta E,\delta F}(q) = \frac{b_1 q + b_2 q^2}{q^2 + 2\xi_F \omega_F q + \omega_F^2}. \quad (59)$$

Using the Matlab command fminunc( ), an optimization problem is solved to find an optimal fit of $\tilde{P}_{\delta_F}$ to a desired plant $\tilde{P}_{\delta_F}^{des}$ by tuning the parameter vector $[b_1\ b_2\ \xi_F\ \omega_F]$. The cost function to be minimized is chosen to be $$J = \sum_{\omega_k \in \Omega} |\tilde{P}_{q,\delta_F}(j\omega_k) - \tilde{P}_{q,\delta_F}^{des}(j\omega_k)| \quad (60)$$

Figure 8:
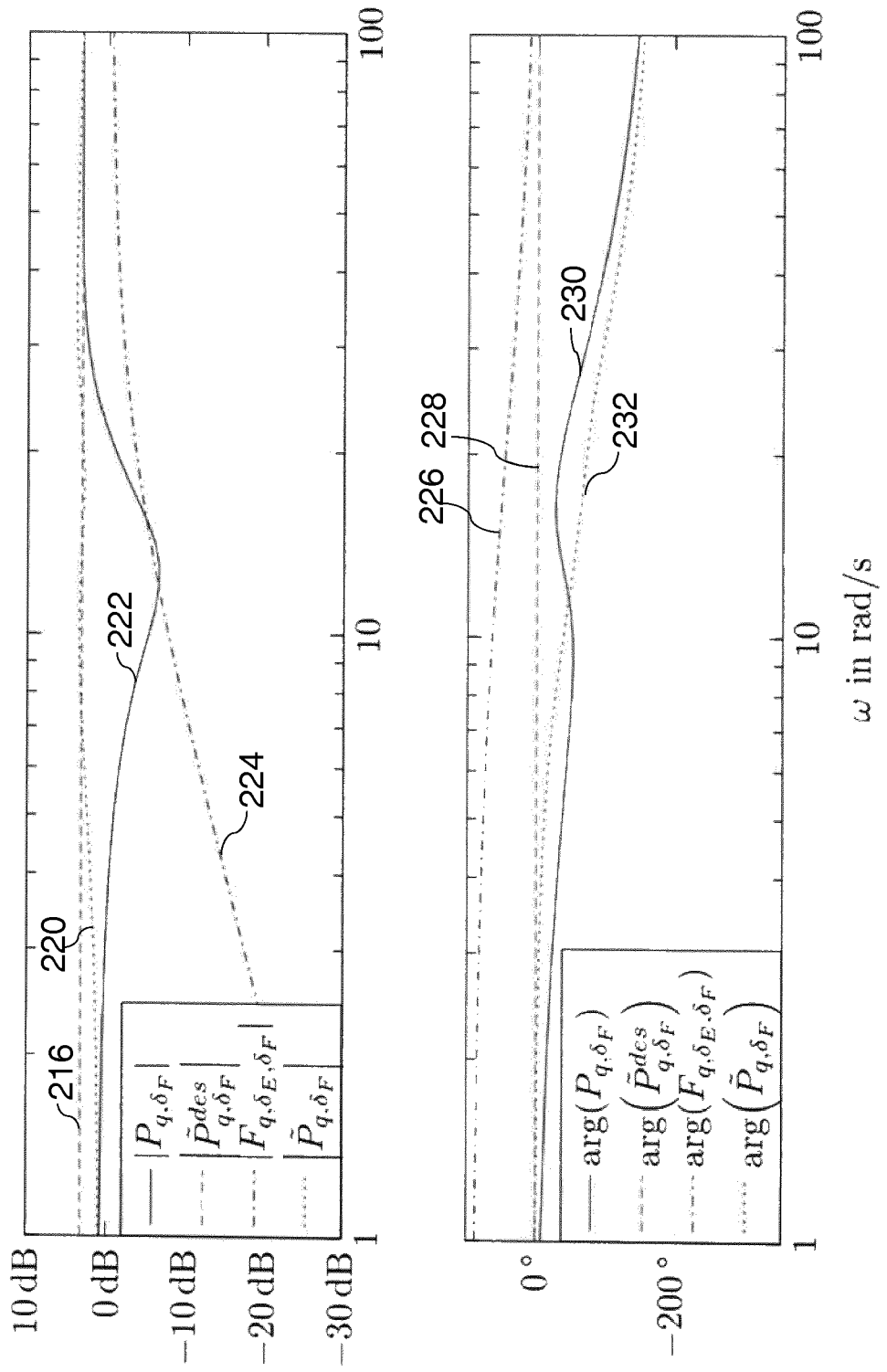
FIG. 8 illustrates an original plant $P_{q,\delta_F}$, desired plant $\tilde{P}_{q,\delta_F}^{des}$, filter $F_{q,\delta_E,\delta_F}$, and resulting plant $\tilde{P}_{q,\delta_F}$.

With $\Omega = 2\pi\{0.3;\ 0.4;\ \ldots;\ 3.9;\ 4\}$. Thus, the magnitude response is optimized at 38 equally spaced frequencies in the considered frequency band. The phase response isn't included in the cost function, as the time delay of the system wasn't determined explicitly and can't be compensated by a causal filter. For a desired plant $\tilde{P}_{\delta_F}^{des} = 1.45$, the optimized filter parameters result as $b_1 = 18.15$, $b_2 = 0.968$, $\xi_F = 0.991$, $\omega_F = 20.04$ rad/s. FIG. 8 depicts the Bode plots of the original plant $|P_{q,\delta_F}|$ 222 and arg($P_{q,\delta_F}$) 230, the desired plant $|\tilde{P}_{q,\delta_F}^{des}|$ 216 and arg($\tilde{P}_{q,\delta_F}^{des}$) 228, the filter $|P_{q,\delta_E,\delta_F}|$ 224 and arg($F_{q,\delta_E,\delta_F}$) 226, and the resulting plant $|P_{q,\delta_F}|$ 220 and arg($P_{q,\delta_F}$) 232.

For implementation, the filter designed in the Tustin-domain is transformed to the discrete domain resulting in $$F_{z,\delta E,\delta F} = \frac{0.7997 - 1.347z^{-1} + 0.5472z^{-2}}{1 - 1.336z^{-1} + 0.4474z^{-2}}. \quad (61)$$

Figure 10:
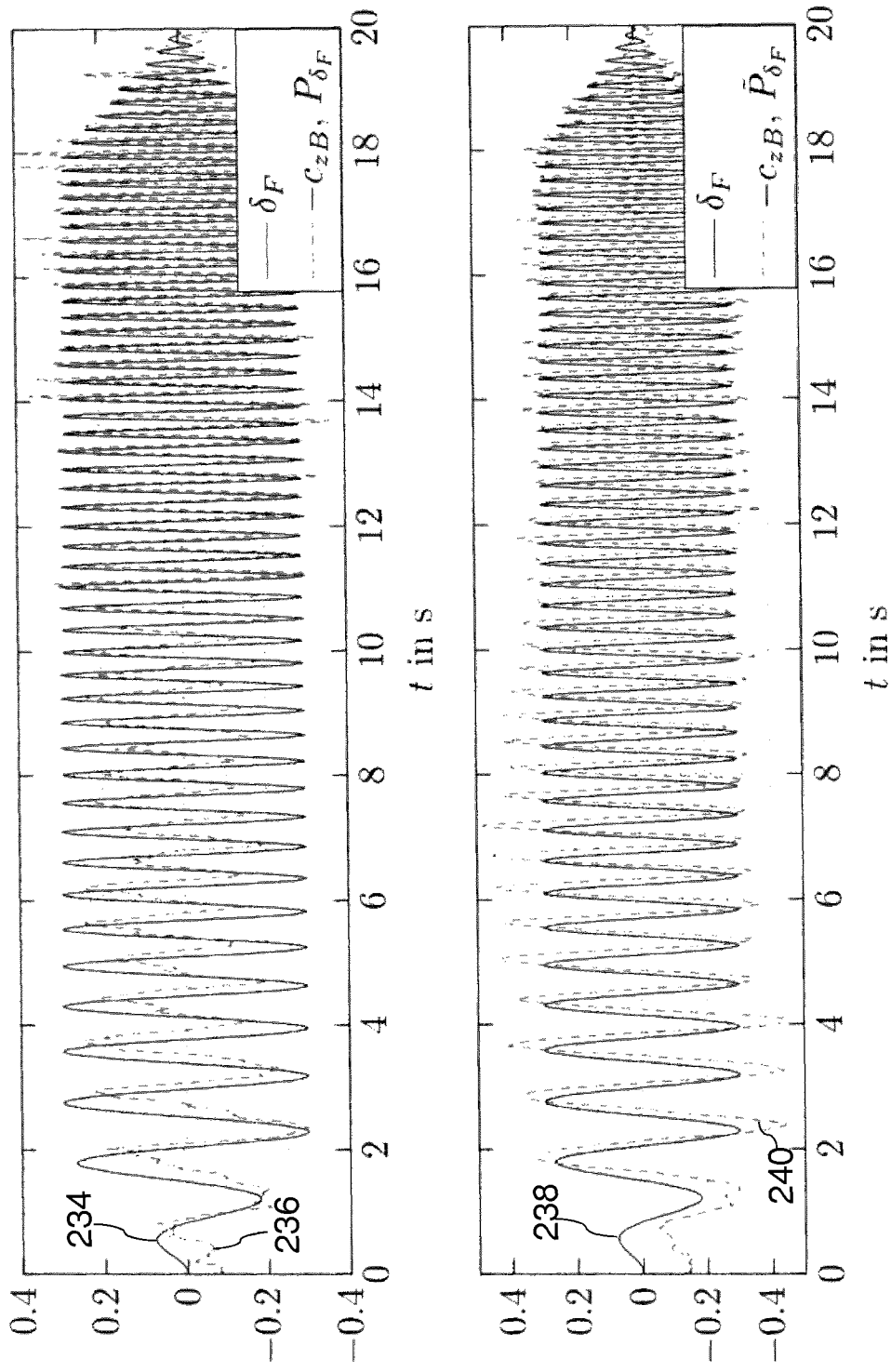
FIG. 10 depicts measured response $-c_{zB}$ to the chirp of $\delta_F$ without and with $F_{\delta_E,\delta_F}$ resulting in $\tilde{P}_{\delta_F}$.

FIG. 10 illustrates the effect of the filter by comparing the responses of $-c_{zB}$ 236, 240 to the identification pattern for $\delta_F$ 234, 238 without and with the filter $F_{z,\delta_E,\delta_F}$, which were measured during test flights. In the time interval from 2 s until 12 s frequencies in the region of 2 Hz are excited. This corresponds to the frequency band where the antiresonance occurs, cf. FIG. 8. The antiresonance is clearly evident in the response without $F_{\delta_E,\delta_F}$, which is illustrated in the upper plot of FIG. 10. The lower plot of FIG. 10 shows the response of $-c_{zB}$ including the filter $F_{\delta_E,\delta_F}$. The antiresonance is confirmed to be compensated, i. e., almost constant magnification can be achieved.

The plant $\tilde{P}_{\delta_E}$ is identified, with identification conditions of the table of FIG. 9, as $$\tilde{P}_{z,\delta_F} = \frac{0.137 + 0.135z^{-1}}{1 - 1.25z^{-1} + 0.44z^{-2}}. \quad (62)$$

For this plant the $c_{zB}$ controller is designed, as demonstrated for the controller $C_{\omega_{yB}}$. With $\omega_{0dB} = 15$ rad/s and $\omega_P = 1.8\ \omega_{0dB} = 27$ rad/s, the controller $C_{z,c_{zB}}$ results as $$C_{z,c_{zB}} = k_P + k_I \frac{T_s}{z-1}, k_P = 0.4773, k_I = 10.1479. \quad (63)$$

Figure 11:
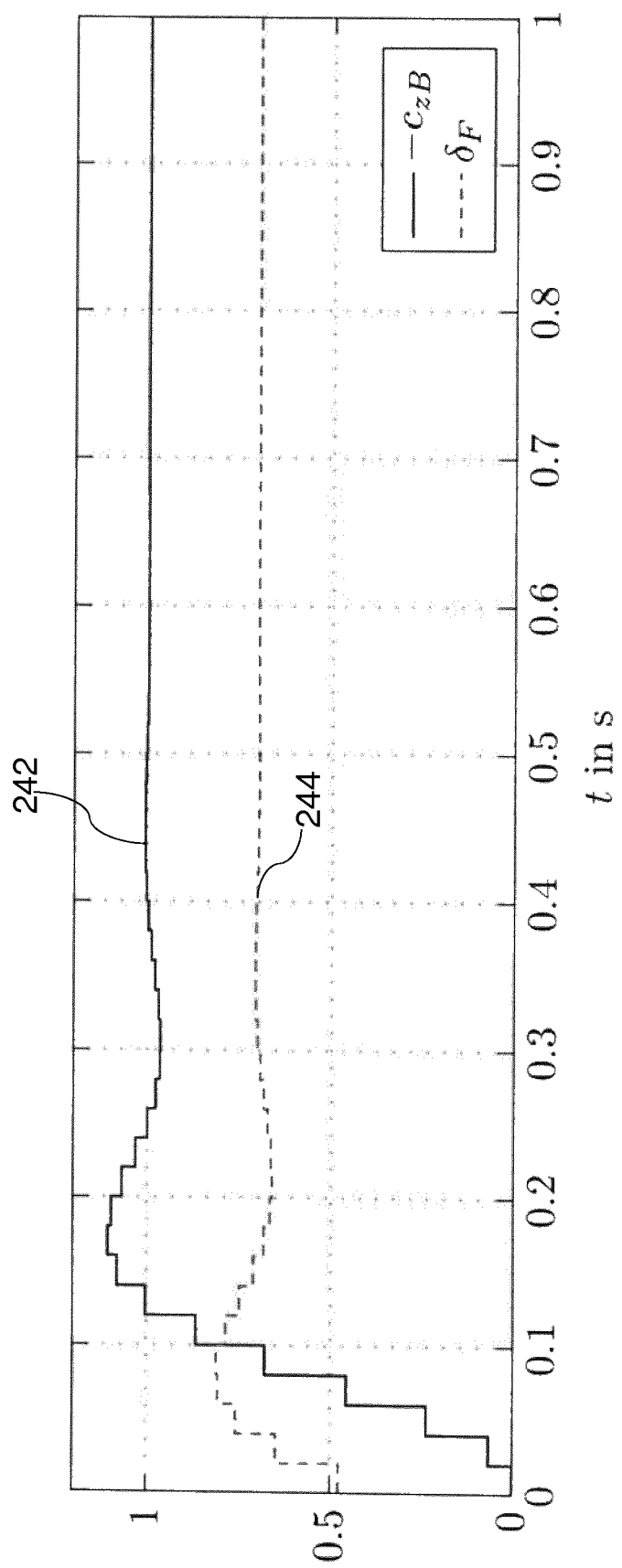
FIG. 11 shows a closed loop step response of $-c_{zB}$ and $\delta_F$ for $-c_{zB}^{des}=1$.
Figure 12:
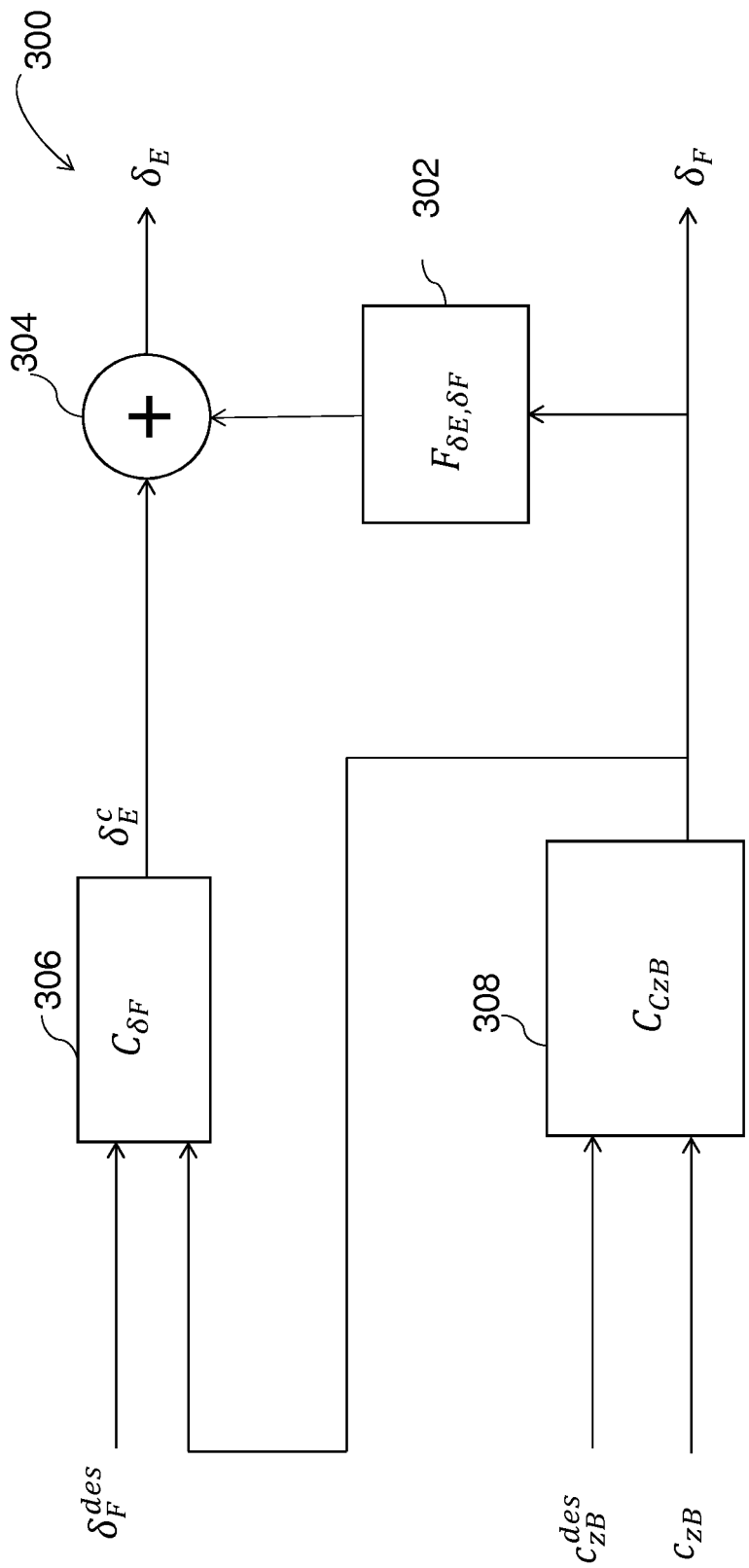
FIG. 12 illustrates a structure of a $c_{zB}$-control including $C_{c_{zB}}$, $C_{\delta_F}$ and a designed filter $F_{\delta_E,\delta_F}$.

The effective range of accelerations that can be generated by $\delta_F$ is limited. FIG. 11 shows the closed loop step response of $-c_{zB}$ 242, and $\delta_F$ 244, for $-c_{zB}^{des} = 1$, which corresponds to $-a_{zB} = a_{ref} = 9.81$ m/s² at $V_A = V_{ref} = 12$ m/s. The flaps 244 show a steady state deflection of $\delta_F = 0.7$. Furthermore, flaps parasitically generate drag for high deflections. Thus, a method is implemented to return $\delta_F$ to $\delta_F^{des} = 0$. FIG. 12 shows the structure 300 of the implemented control to track a desired $c_{zB}^{des}$. $\delta_E$ consists of the sum created by an adder 304 of the filter output of $F_{\delta_E,\delta_F}$ of a feed forward filter 302, which is designed to compensate the antiresonance, and the output (candidate elevator angle $\delta_E^C$) of a first controller 306, $C_{\delta_F}$, which will be designed to counter steady state flap deflection. $C_{\delta_F}$ will be designed of considerably lower bandwidth than a second controller 308, $C_{c_{zB}}$, to prevent interactions of the two controllers 306, 308. For slow flight $\delta_F^{des}$ can also be specified to $\delta_F^{des} > 0$, however, the input limits must be considered to maintain enough control input range of $\delta_F$ for $C_{c_{zB}}$.

Thus, the response $P_{\delta_F,\delta_E}$ of $\delta_E$ to $\delta_F$ is identified, while $C_{c_{zB}}$ is tracking $c_{zB}^{des} = c_{zB,0}$, as indicated in table of FIG. 13. $c_{zB,0}$ is calculated by a low-pass filter analogously to $\delta_{T,0}$. The transfer function is identified as $$P_{z,\delta F,\delta E} = \frac{0.124 - 0.197z^{-1}}{1 - 1.61z^{-1} + 0.634z^{-2}} \quad (64)$$

For $\omega_{0dB}=3$ rad/s, a fifth of the bandwidth of $C_{c_{zB}}$, and $\omega_P=2\omega_{0dB}=6$ rad/s, the second controller 308 $C_{\delta_F}$ results as $$C_{z,\delta_F} = k_P + k_I \frac{T_s}{z-1}, k_P = -0.1948, k_I = -1.1025 \quad (65)$$

Figure 14:
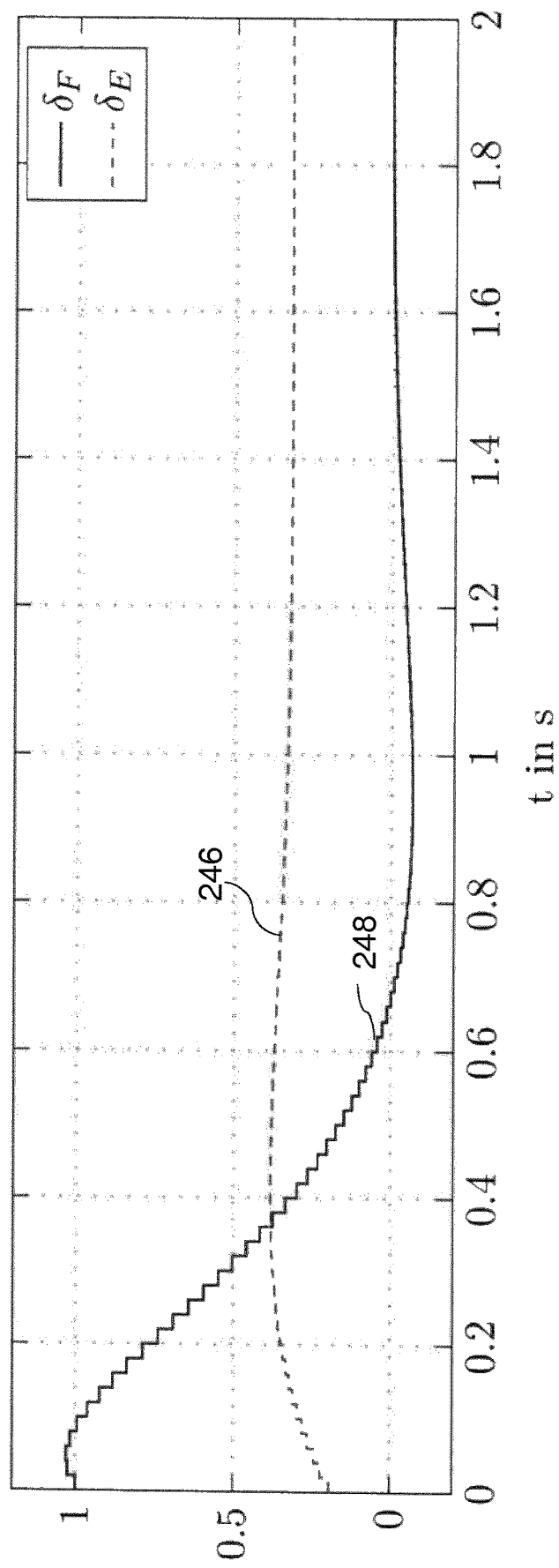
FIG. 14 illustrates a response of $\delta_E$ and $\delta_F$ to an output disturbance $\delta_F=1$.

As $C_{c_{zB}}$ produces an output disturbance that shall be returned to the desired value $\delta_F^{des}=0$, the response to a disturbance of $\delta_F=1$ is presented in FIG. 14 instead of reference tracking, wherein FIG. 14 shows a response of $\delta_E$ 246 and $\delta_F$ 248 to an output disturbance $\delta_F=1$. An overshoot of about 6% and a rise time of about 0.7 s can be observed.

Figure 15:
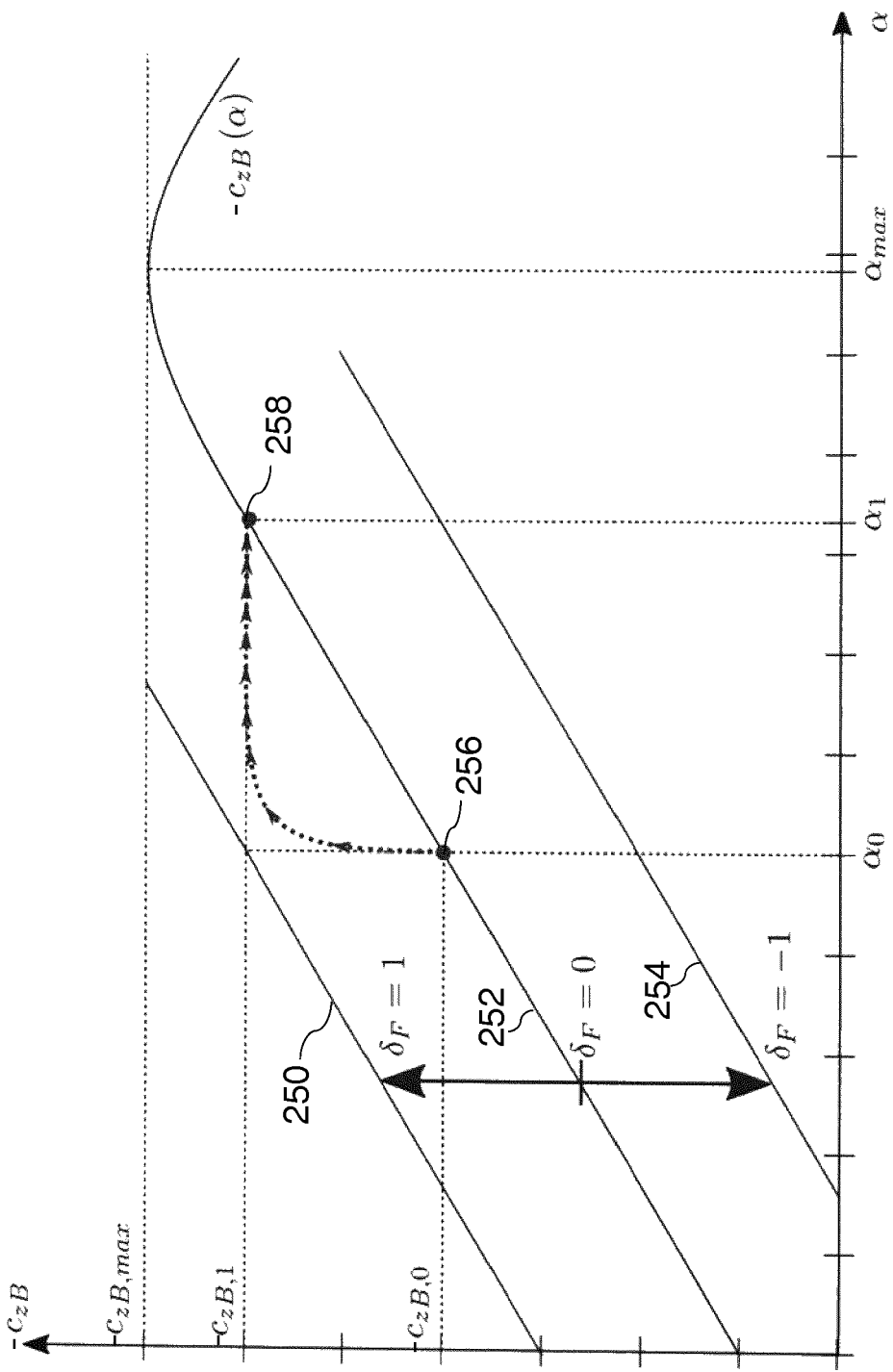
FIG. 15 depicts a setpoint change from $c_{zB,0}$ to $c_{zB,1}$.

Finally, the functionality of the control concept is illustrated in FIG. 15. The diagram shows a typical lift curve 252, which mainly generates $-c_{zB}$, over the angle of attack $\alpha$. The effect of the flaps $\delta_F$ 250, 254 is to shift the curve $-c_{zB}(\alpha)$, upwards for positive $\delta_F$. The effect of the elevator $\delta_E$ is to manipulate $\alpha$ to reach different points of $-c_{zB}(\alpha)$, which constitutes the conventional method for varying the lift. The introduced control concept includes the flaps for highly dynamic $c_{zB}$ variations. FIG. 15 outlines the setpoint change from $-c_{zB,0}$ 256 to $-c_{zB,1}$ 258. First, $C_{c_{zB}}$ via $\delta_F$ with a designed bandwidth of about 15 rad/s increases $-c_{zB}$ in a highly dynamic manner. Then $C_{\delta_F}$ via $\delta_E$ returns $\delta_F$ to the initial value, in this case $\delta_F^{des}=0$. The different dynamics are emphasized by the small arrows, which shall correspond to constant time steps. Thus, the new value $-c_{zB,1}$ is reached with the high dynamics of $C_{c_{zB}}$, whereas the horizontal movement approximately on the level of $-c_{zB,1}$ is based on a fifth of the bandwidth, thus, 3 rad/s. The transition from $\delta_F$ to $\delta_E$ is similar to FIG. 14.

Not including $\delta_F$, thus, controlling $c_{zB}$ directly via $\delta_E$, cf. $P_{q,\delta_E}$ in FIG. 5, would limit the bandwidth to approximately 7 rad/s. Due to the low-pass characteristic of the short-period mode above approximately 12 rad/s even faster actuators and smaller time delays could not improve a direct control concept with $\delta_E$. This is due to the fact that the whole aircraft must rotate to alter the lift by means of changing $\alpha$.

In contrast, the implementation of the introduced two-stage control concept proves to not be limited by the short-period mode. Therefore, a faster system could further rise the achievable bandwidth.

The curve $-c_{zB}(\alpha)$ is pretty linear until the region around $\alpha_{max}$ where the wings begin to stall and lift decreases again. By setting a limitation to a value below $-c_{zB,max}$, e. g., $-c_{zB,1}$, a simple, but effective stall prevention can be implemented.

As a summary, various linear controllers are designed to fulfill two basic tasks. Firstly, the pitch $\theta$, roll $\varphi$, airspeed $V_A$, and side acceleration $a_{yB}$ controllers are used to maintain coordinated, straight, and level flight at a desired airspeed. This is used for maintaining an equilibrium state during identification maneuvers and furthermore, achieving a well defined initial state at the beginning of test flights for validation of the PFC concept. Secondly, when the path following control is active, the inner loop controllers realize the desired input u of the reduced plant $$\frac{d^2 r_I}{dt^2} = u.$$

The results of (29), (31), (32), and (54) are combined to obtain the necessary transformations to calculate $a_{xB}^{des}$, $c_{zB}^{des}$ and $\varphi^{des}$, for given $\theta$, $\psi$, $g$, and the desired input u as $$\begin{bmatrix} a_{xB}^{des} \\ a_{zB,S}^{des} \\ a_{zB,C}^{des} \end{bmatrix} = D(\theta, \psi)^{-1} \left( \begin{bmatrix} 0 \\ 0 \\ -g \end{bmatrix} + u \right) \quad (66)$$

$$-a_{zB}^{des} = \sqrt{(a_{zB,C}^{des})^2 + (a_{zB,S}^{des})^2} \quad (67)$$

$$c_{zB}^{des} = \frac{a_{zB}^{des}}{V_A^2} \frac{V_{ref}^2}{a_{ref}} \quad (68)$$

$$\varphi^{des} = \mathrm{atan}\left(\frac{a_{zB,S}^{des}}{a_{zB,C}^{des}}\right) \quad (69)$$

with D according to (28). Thus, the tasks of $C_7$, $C_{c_{zB}}$, $C_{a_{xB}}$ are to track the according desired value, which result in the inertial accelerations $$\frac{d^2 r_I}{dt^2} = u.$$

The desired reference input for $C_{\delta_F}$ is chosen as $\delta_F^{des}=0$, which may be adapted during take-off and landing. The desired reference input for $C_{a_{yB}}$ is $a_{yB}^{des}=0$, according to coordinated flight. By considering the influence of airspeed variation, the designed controllers may be used for the entire speed range. A common system variation in aviation is varying mass due to changing payload. The nature of the acceleration controllers for $a_{xB}$ and $c_{zB}$, which corresponds to $a_{zB}$, is the generation of forces. According to the conservation of linear momentum for constant mass, the forces are proportional to the accelerations by multiplication of mass. Thus, mass variations can be corrected by adapting the open loop gain of the corresponding controller by the factor $$\frac{m}{m_{ref}},$$

where $m_{ref}$ is the mass for which the controller has been designed. The actual mass m can be measured or approximately calculated during the standard mass and balance calculations during flight preparation. As a conclusion, the inner loop controllers are designed to obtain a system $$\frac{d^2 r_I}{dt^2} = u$$

by means of the nonlinear transformation (66, 67, 68, 69). The nonlinearities of the aircraft are primarily based on cosine and sine functions of orientation and the dependencies of forces and torques on airspeed. These relations are known and can be compensated to obtain an exactly linear plant by means of inner loop control.

Based on the system $$\frac{d^2 r_I}{dt^2} = u,$$

cf. (16) and (30), a path following control for a fixed wing aircraft is designed. Thus, by the assumed inner loop controllers, which realize the desired accelerations $a_I^{des} \approx u$, this system appears in Brunovsky form with vector relative degree $\{2, 2, 2\}$ for the output $r_I=[x_I\ y_I\ z_I]^T$. The so-called path parameter $\zeta$ defines the desired path $\sigma(\zeta)$ in parameterized form. $\sigma(\zeta)$ is required to be twofold differentiable, and, if the resulting accelerations shall be continuous, twofold continuously differentiable. Henceforth, the dependency of time $r_I(t)$, $\zeta(t)$, etc. is omitted for clarity, except for special emphasis. The derivatives are abbreviated as $$\sigma' = \frac{\partial \sigma}{\partial \zeta}$$

and $\dot\zeta = d\zeta/dt$, etc.

The control objectives of PFC are defined as follows.

The output $r_I$ converges asymptotically to the path $\sigma(\cdot)$, $$\text{i.e., } \inf_\zeta \|r_I - \sigma(\zeta)\| \to 0$$

for $t \to \infty$. (asymptotic convergence)

If at $t_0$ the aircraft position $r_I$ is on the path and the velocity $v_I$ is parallel to the path, i. e., $\exists \zeta_0: r_I = \sigma(\zeta_0) \wedge v_I = \kappa \sigma'(\zeta_0), \kappa \in \mathbb{R}$, then $$\inf_\zeta \|r_I(t) - \sigma(\zeta)\| = 0$$

for all $t \geq t_0$. (invariance property)

The requirements for $\zeta(t)$ depend on the operation mode. (tangential motion)

In the following, the operation mode for realizing a path following controller with a desired path speed is deduced. Considering the path error $e_P = r_I - \sigma(\zeta)$, the error dynamics are $$e_P = \underbrace{r_I - \sigma(\zeta)}_{r_P} \tag{70}$$

$$\frac{d}{dt}e_P = \frac{d}{dt}r_I - \frac{d}{dt}(\sigma(\zeta)) = v_I - \underbrace{\sigma'(\zeta)\dot\zeta}_{v_P} \tag{71}$$

$$\frac{d^2}{dt^2}e_P = \frac{d^2}{dt^2}r_I - \frac{d^2}{dt^2}(\sigma(\zeta)) = u - \underbrace{(\sigma''(\zeta)\dot\zeta^2 + \sigma'(\zeta)\ddot\zeta)}_{a_P} \tag{72}$$

For the special case on hand, also analogies to a PID-Control can be made. Therefore, the coefficients of the feedback terms are named $k_P$, $k_I$, and $k_D$. For $$u = \sigma''(\zeta)\dot\zeta^2 + \sigma'(\zeta)\ddot\zeta - k_P e_P - k_D \frac{d}{dt}e_P, \tag{73}$$

the desired error dynamics $$\frac{d^2}{dt^2}e_P + k_D \frac{d}{dt}e_P + k_P e_P = 0 \tag{74}$$

can be specified by tuning the parameters $k_P > 0$ and $k_D > 0$ according to the characteristic polynomial $p(s) = s^2 + k_D s + k_P$. It is also possible to obtain individual dynamics for the different Cartesian axes by using the matrix $K_P = \text{diag}([k_{p1}\ k_{p2}\ k_{p3}])$ instead of the scalar $k_P$, and $K_D$ in an analogous manner. Furthermore, individual dynamics for other than the Cartesian axes of the inertial frame could be defined by use of nondiagonal $K_P$ and $K_D$. In this disclosure, just the case of scalar parameters is considered.

It seems reasonable to compare the designed error dynamics (74) to a three dimensional spring-damper-system, where the equilibrium point continuously changes according to the path parameter $\zeta(t)$ and the corresponding path position $\sigma(\zeta(t))$. Thus, the terms in (73) can be interpreted as spring action $-k_P e_P$, damper action $$k_D \frac{d}{dt}e_P,$$

acceleration feedforward $\sigma''(\zeta)\dot\zeta^2$ due to path parameter speed $\dot\zeta$, and acceleration feedforward $\sigma'(\zeta)\ddot\zeta$ due to path parameter acceleration $\ddot\zeta$.

By introducing an integral error $$\frac{d}{dt}e_I = e_P,$$

the final control law for the input results as $$u = \sigma''(\zeta)\dot\zeta^2 + \sigma'(\zeta)\ddot\zeta - k_P e_P - k_D \frac{d}{dt}e_P - k_I e_I \tag{75}$$

Therefore, the error dynamics extend to $$\frac{d^3}{dt^3}e_P + k_D \frac{d^2}{dt^2}e_P + k_P \frac{d}{dt}e_P + k_I e_P = 0, \tag{76}$$

with the additional tuning parameter $k_I > 0$ yielding the corresponding characteristic polynomial $p(s) = s^3 + k_D s^2 + k_P s + k_I$.

For the calculation of the control law (75), the course of the path parameter $\zeta(t)$ must be specified, which depends on the operation mode. The operation mode is characterized by a freely definable path speed $V_P^{des}(t)$. In the general case of a path without natural parameterization, the path parameter derivatives $\dot\zeta$ and $\ddot\zeta$ have to be adapted continuously to achieve the desired path speed $\|v_P\|\lambda = V_P^{des}(t)$, where $\lambda \in \{-1, 1\}$ specifies the flying direction along the path, i. e., $\lambda = \text{sgn}(V_P^{des}) = \text{sgn}(\dot\zeta)$. According to the desired path position $r_P = \sigma(\zeta)$, the desired path speed follows as $\|v_P\|\lambda = \|\sigma'(\zeta)\|\dot\zeta$ and thus $$\dot\zeta = \frac{V_P^{des}(t)}{\|\sigma'(\zeta)\|} \tag{77}$$

$$v_P = \frac{\sigma'(\zeta)}{\|\sigma'(\zeta)\|} V_P^{des}(t). \tag{78}$$

For the thereby specified path parameter speed $\dot\zeta$ and with the desired path acceleration $A_P^{des}(t) = \dot V_P^{des}(t)$, the path parameter acceleration follows in the form $$\ddot{\zeta} = \frac{A_P^{des}(t)}{\|\sigma'(\zeta)\|} - \frac{(\sigma'(\zeta))^T \sigma''(\zeta)}{\|\sigma'(\zeta)\|^2} \dot{\zeta}^2. \quad (79)$$

From these quantities the desired acceleration $$a_P = \frac{d^2}{dt^2} r_P$$

can be calculated as $$a_P = \sigma''(\zeta)\dot{\zeta}^2 + \sigma'(\zeta)\ddot{\zeta}. \quad (80)$$

If $\sigma(\zeta)$ is twofold continuously differentiable and $V_P^{des}(t)$ is continuously differentiable, i.e., $\sigma''(\zeta)$ and $A_P^{des}(t)$ are continuous, also $a_P$ results to be continuous. For the case of a natural parameterization, the relations $(\sigma'(\zeta))^T \sigma'(\zeta)=1$ and therefore $(\sigma'(\zeta))^T \sigma''(\zeta)=0$ hold. Thus, $\dot{\zeta}$ and $\ddot{\zeta}$ in (77) and (79) are reduced to $$\dot{\zeta} = V_P^{des}(t) \quad (81)$$

$$\ddot{\zeta} = A_P^{des}(t). \quad (82)$$

Finally, by application of the path following control law (75), the input for the inner controllers u, cf. (66, 67, 68, 69), is calculated. The operation mode to fly with a definable path speed $V_P^{des}(t)$ is achieved by choosing the path parameter $\zeta$ according to (77) and (79).

The invention claimed is:

1. A method for controlling a pitch moment generator element of an aircraft, the method comprising:
  a step of determining a pitch control input $\delta_E$ for the at least one pitch moment generator element, based on a lift control input $\delta_F$ for at least one lift generator element;
  wherein the step of determining the pitch control input $\delta_E$ based on the lift control input $\delta_F$ includes determining an output $S_{E,FF} = F_{q,\delta E,\delta F}(q)\delta F$ of a feed forward filter $F_{q,\delta E,\delta F}(q)$ for the lift control input $\delta_F$, and
  adding the output $\delta_{E,FF}$ of the feed forward filter $F_{q,\delta E,\delta F}(q)$ to a candidate pitch control input $\delta_E^C$, wherein the candidate pitch control input $\delta_E^C$ is controlled by one of a pilot, a flight controller and an autopilot;
  wherein determining the output $\delta_{E,FF}$ of the feed forward filter $F_{q,\delta E,\delta F}(q)$ includes at least one of the following:
  high pass filtering the lift control input $\delta_F$ by a high pass;
  high pass filtering the lift control input $\delta_F$ by a lead-filter;
  high pass filtering the lift control input $\delta_F$ by a high pass of second order.

2. The method according to claim 1, wherein the pitch control input for at least one pitch moment generator element is constituted by a commanded elevator angle $\delta_E$ to be determined based on a flap element angle $\delta_F$ constituting a lift control input for at least one lift generator element.

3. The method according to claim 1, wherein the lift control input $\delta_F$ is commanded by one of a pilot, a flight controller and an autopilot.

4. The method according to claim 1, wherein the lift control input $\delta_F$ for the at least one lift generator element determines at least one of:
  a deflection of a flap;
  a deflection of a flaperon;
  a deflection of a spoiler;
  a deflection of a slat;
  an angle of incidence of a wing;
  a lift generating change of a wing shape;
  a lift generating thrust of a micro-thruster;
  a lift generating thrust of a propulsion unit;
  and the pitch control input $\delta_E$ for the at least one pitch moment generator element determines at least one of:
  a deflection of an elevator;
  an angle of incidence of a horizontal stabilizer;
  an angle of incidence of a canard foreplane;
  a pitch moment generating change of a wing shape;
  a pitch moment generating thrust of a micro-thruster;
  a pitch moment generating thrust of a propulsion unit.

5. The method according to claim 1, wherein the feed forward filter $F_{q,\delta E,\delta F}(q)$ is determined by the following formula:

$$F_{q,\delta E,\delta F}(q) = \frac{b_1 q + b_2 q^2}{q^2 + 2\xi_F \omega_F q + \omega_F^2}$$

wherein
q is the Laplace variable;
$b_1$ is a first optimization parameter;
$b_2$ is a second optimization parameter;
$\xi_F$ is a third optimization parameter; and
$\omega_F$ is a fourth optimization parameter.

6. The method according to claim 1, further comprising the steps of:
  determining a desired lift control input $\delta_F^{des}$; and
  determining the candidate pitch control input $\delta_E^C$ based on the lift control input $\delta_F$ and the desired lift control input $\delta_F^{des}$ of the aircraft,
  wherein the step of determining a candidate pitch control input $\delta_E^C$ includes a PI control based on the lift control input $\delta_F$ and the desired lift control input $\delta_F^{des}$ of the aircraft.

7. The method according to claim 1, further comprising the steps of:
  determining an actual vertical acceleration $a_{zB}$ of the aircraft;
  determining a desired vertical acceleration $a_{zB}^{des}$ of the aircraft; and
  controlling the lift control input $\delta_F$ based on the actual vertical acceleration $a_{zB}$ of the aircraft and the desired vertical acceleration $a_{zB}^{des}$ of the aircraft.

8. The method according to claim 1, comprising pre-actuating the lift generator element thereby to subsequently allow it to both decrease lift and increase lift.

9. A computer program product that when loaded into a memory of a computer having a processor executes a method for controlling a pitch moment generator element of an aircraft, the method comprising:
  a step of determining a pitch control input $\delta_E$ for the at least one pitch moment generator element, based on a lift control input $\delta_F$ for at least one lift generator element;
  wherein the step of determining the pitch control input $\delta_E$ based on the lift control input $\delta_F$ includes determining an output $\delta_{E,FF} = F_{q,\delta E,\delta F}(q)\delta F$ of a feed forward filter $F_{q,\delta E,\delta F}(q)$ for the lift control input $\delta_F$, and
  wherein determining the output $\delta_{E,FF}$ of the feed forward filter $F_{q,\delta E,\delta F}(q)$ includes at least one of the following:
  high pass filtering the lift control input $\delta_F$ by a high pass;
  high pass filtering the lift control input $\delta_F$ by a lead-filter; and
  high pass filtering the lift control input $\delta_F$ by a high pass of second order.

10. A flight controller adapted to control at least one pitch moment generator element of at least one of an aircraft and a component of a flight simulator, the flight controller being comprised in at least one of an aircraft and a flight simulator, and comprising:

a feed forward filter $F_{q,\delta E,\delta F}(q)$ adapted to determine a pitch control input $\delta_E$ for the at least one pitch moment generator element, based on a lift control input $\delta_F$ for the at least one lift generator element, by determining an output $\delta_{E,FF} = F_{\delta E,\delta F}(q)\delta F$ of the feed forward filter $F_{q,\delta E,\delta F}(q)$ for the lift control input $\delta_F$, wherein the feed forward filter includes at least one of the following:

a high pass filter for filtering the lift control input $\delta_F$;
a lead filter for filtering the lift control input $\delta_F$;
a high pass of second order for filtering the lift control input $\delta_F$.

11. The flight controller according to claim 10, wherein the pitch control input for at least one pitch moment generator element is constituted by a commanded elevator angle $\delta_E$ to be determined based on a flap element angle $\delta_F$ constituting a lift control input for at least one lift generator element.

12. The flight controller according to claim 10, wherein the lift control input is commanded by one of a pilot, a flight controller and an autopilot.

13. The flight controller according to claim 10, wherein the lift control input $\delta_F$ for the at least one lift generator element determines at least one of:

a deflection of a flap;
a deflection of a flaperon;
a deflection of a spoiler;
a deflection of a slat;
an angle of incidence of a wing;
a lift generating change of a wing shape;
a lift generating thrust of a micro-thruster;
a lift generating thrust of a propulsion unit;
and the pitch control input $\delta_E$ for the at least one pitch moment generator element determines at least one of:
a deflection of an elevator;
an angle of incidence of a horizontal stabilizer;
an angle of incidence of a canard foreplane;
a pitch moment generating change of a wing shape;
a pitch moment generating thrust of a micro-thruster;
a pitch moment generating thrust of a propulsion unit.

14. A flight controller according to claim 10, wherein the feed forward filter $F_{q,\delta E,\delta F}(q)$ is determined by the following formula:

$$F_{q,\delta E,\delta F}(q) = \frac{b_1 q + b_2 q^2}{q^2 + 2\xi_F \omega_F q + \omega_F^2}$$

wherein
q is the Laplace variable;
$b_1$ is a first optimization parameter;
$b_2$ is a second optimization parameter;
$\xi_F$ is a third optimization parameter; and
$\omega_F$ is a fourth optimization parameter.

15. The flight controller according to claim 10, comprising an adder for adding an output $\delta_{E,FF}$ of the feed forward filter $F_{q,\delta E,\delta F}(q)$ to a candidate pitch control input $\delta_E^C$, wherein the candidate pitch control input $\delta_E^C$ is controlled by one of a pilot, a flight controller and an autopilot.

16. The flight controller according to claim 15, further comprising a first controller adapted to determine a candidate pitch control input $\delta_E^C$ based on the lift control input $\delta_F$ and a desired lift control input $\delta_F^{des}$ of the aircraft, wherein the first controller is a PI controller.

17. The flight controller according to claim 10, further comprising a second controller adapted to control the lift control input $\delta_F$ based on an actual vertical acceleration $a_{zB}$ of the aircraft and a desired vertical acceleration $a_{zB}^{des}$ of the aircraft.

18. The flight controller according to claim 10, comprising a configuration allowing it to pre-actuate the lift generator element thereby to subsequently allow it to both decrease lift and increase lift.

* * * * *